United States Patent
Kamoshida

(10) Patent No.: US 8,312,361 B2
(45) Date of Patent: Nov. 13, 2012

(54) ARITHMETIC CIRCUIT, ARITHMETIC PROCESSING DEVICE, AND ARITHMETIC PROCESSING METHOD

(75) Inventor: Shiro Kamoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/801,695

(22) Filed: Jun. 21, 2010

(65) Prior Publication Data

US 2010/0332957 A1      Dec. 30, 2010

(30) Foreign Application Priority Data

Jun. 29, 2009   (JP) .................... 2009-153130

(51) Int. Cl.
    *H03M 13/00* (2006.01)
(52) U.S. Cl. .................... 714/799; 714/48; 708/530
(58) Field of Classification Search .............. 714/748, 714/799; 708/530
    See application file for complete search history.

(56) References Cited

U.S. PATENT DOCUMENTS

| | | | | |
|---|---|---|---|---|
| 5,321,644 A | * | 6/1994 | Schibinger | 708/530 |
| 5,541,936 A | * | 7/1996 | Tanaka | 714/736 |
| 5,600,664 A | * | 2/1997 | Hayashi | 714/794 |
| 5,751,618 A | * | 5/1998 | Abiko et al. | 708/490 |
| 5,880,982 A | * | 3/1999 | Evans | 708/530 |
| 6,725,415 B2 | * | 4/2004 | Ishiwaki | 714/781 |
| 6,754,542 B1 | * | 6/2004 | Tanaka | 700/42 |
| 7,035,891 B2 | * | 4/2006 | Makineni et al. | 708/530 |
| 7,412,475 B1 | * | 8/2008 | Govindarajalu | 708/530 |
| 7,707,477 B2 | * | 4/2010 | Go et al. | 714/758 |
| 7,941,473 B2 | * | 5/2011 | Ito | 708/530 |

FOREIGN PATENT DOCUMENTS

JP   62-212728   9/1987

OTHER PUBLICATIONS

Extended European Search Report dated Nov. 18, 2010 in Application No. 10166053.8.
Bryant, "Bit-Level Analysis of an SRT Divider Circuit", Proceedings of the 33rd Design Automation Conference 1996, Las Vegas, Jun. 3-7, 1996, pp. 661-665.
Cornetta et al., "A Radix-16 SRT Division Unit with Speculation of the Quotient Digits", VLSI, 1999, Proceedings, Ninth Great Lakes Symposium on Ypsilanti, MI, Mar. 4-6, 1999 (4 pages).

(Continued)

*Primary Examiner* — Esaw Abraham
(74) *Attorney, Agent, or Firm* — Staas & Halsey LLP

(57) ABSTRACT

In an arithmetic circuit, every time a numerical value is stored in a register, a partial solution is predicted on the basis of the numerical value, an intermediate value is generated by a predetermined calculation using one or more predicted partial solutions, an extended sign bit is appended to the intermediate value by sign extension, and the intermediate value to which the extended sign bit is appended is stored in the register. In addition, the solution is generated on the basis of the one or more partial solutions. A value of a sign bit constituting the intermediate value stored in the register is compared with a value of the extended sign bit stored in the register, and an error signal is outputted when the value of the sign bit is different from the value of the extended sign bit.

13 Claims, 11 Drawing Sheets

OTHER PUBLICATIONS

Tzu-His Pan et al., "High-Radix SRT Division with Speculation of Quotient Digits," Computer Design: VLSI in Computers and Processors, 1995, IEEE Int'l Conference in Austin, TX, Oct. 2-4, 1995 (pp. 479-484).

Ercegovac et al., "Fast Radix-2 Division With Quotient-Digit Prediction", Journal of VLSI Signal Processing Systems for Signal, Image and Video Technology, Springer, NY, Nov. 1, 1989 (pp. 169-180).

Atkins, "Higher-Radix Division Using Estimates of the Divisor and Partial Remainders", IEEE Transactions on Computers, vol. C-17, No. 10, Oct. 1968 (pp. 925-934).

Patent Abstracts of Japan, Publication No. 62-212728, Published Sep. 18, 1987.

* cited by examiner

```
                                              Contents of Intermediate-
                                              remainder Register 10111111
      10000001 ) 11000000             ───▶    00 11000000
                  -10000001
                   +1111110            ───▶    00 01111110
                          0
                  +11111100            ───▶    00 11111100
                  -10000001
                   +11110110           ───▶    00 11110110
                   -10000001
                    +11101010          ───▶    00 11101010
                    -10000001
                     +11010010         ───▶    00 11010010
                     -10000001
                      +10100010        ───▶    00 10100010
                      -10000001
                       +1000010        ───▶    00 01000010
                       -10000001
                        -1111110       ───▶    11 10000010   (=Two's Complement of
                                                                  00 01111110)
```

FIG. 4

Contents of
                                   Intermediate-remainder
                                          Register

ARITHMETIC CIRCUIT, ARITHMETIC PROCESSING DEVICE, AND ARITHMETIC PROCESSING METHOD

CROSS-REFERENCE TO RELATED APPLICATION(S)

This application is based upon and claims the benefits of priority of the prior Japanese Patent Application No. 2009-153130, filed on Jun. 29, 2009, the entire contents of which are incorporated herein by reference.

FIELD

The embodiments discussed herein are related to an arithmetic circuit, an arithmetic processing device, and an arithmetic process.

BACKGROUND

The arithmetic logic circuits include adder-subtracters, dividers, square-root calculators, and the like. The techniques for division and square-root calculation by use of an electronic circuit include the restoring algorithm, the nonrestoring algorithm, the SRT (Sweeney-Robertson-Tocher) algorithm, and the like. In those arithmetic algorithms, an operation for obtaining n digits of a quotient or a square root is repeated, where n is a natural number. The above arithmetic algorithms have a feature that the total number of digits of the quotient or the square root is proportional to the number of repetition of the above operation. Since a subtraction and a digit shift are repeated in the above arithmetic algorithms as in the calculation on paper, the above arithmetic algorithms are hereinafter referred to as subtraction-and-shift type arithmetic algorithms.

The reliability of the subtraction-and-shift type arithmetic circuits can be improved by detecting a malfunction by use of a malfunction detection device. For example, a known malfunction detection circuit generates a malfunction signal when both of a divisor and a dividend are nonzero and both of the most significant digit of an intermediate quotient (which is obtained by a divider in an intermediate stage before normalization of the quotient) and the overflow digit of the quotient (which is located immediately left-adjacent to the most significant digit of the quotient) are zero, so that the malfunction detection circuit can detect a malfunction in which the quotient becomes zero by error.

Incidentally, some of the logic failures found in the subtraction-and-shift type arithmetic logic operations occur only with some patterns of data which are rarely produced during operation. The positions in the subtraction-and-shift type arithmetic circuit in which logical errors as above are likely to occur are known. However, no technique has been found for proving that the logic in such positions is correct. Therefore, currently, the only ways to find a logical failure occurring with a data pattern which is rarely produced are to visually check a drawing or the like of the logic and to collect results of operational verification tests by logic simulations.

Nevertheless, because the capability of appropriate detection of a logic failure by visual checking relies on the ability of the person who visually checks the logical circuit schematic or the like, the reliability of the logic cannot be ensured by the visual checking.

On the other hand, in the case where the objective circuit is as small as a single operating element, the results of operational verification tests can be collected for a sufficiently long time, and therefore the detection of a logic failure by logic simulations can ensure high reliability. However, in the case where the objective circuit is as large as the subtraction-and-shift type arithmetic circuit, it is difficult to ensure sufficient reliability even when the operational verification tests by logic simulations are performed. That is, the time which can be spent for checking each operational element is limited when verification of a large-scale system is performed by logic simulations or is performed on the real system. Because of such a limitation by time, it is difficult to find a bug in the subtraction-and-shift type arithmetic circuit by logic simulations. Thus, conventionally, improvement in the quality of the logic of the arithmetic circuit is limited.

Even in the case where a failure cannot be completely avoided in advance by the operational verification tests, the reliability can be secured if it is possible to prevent an erroneous calculation result from being passed to a subsequent processing stage. Therefore, there is a demand for a technique for detecting a malfunction with high reliability even in the case where the malfunction rarely occurs during operations for calculation.

[Patent Document 1] Japanese Laid-open Patent Publication No. 62-212728.

SUMMARY

According to an aspect of the present invention, an arithmetic circuit including: a register; a preprocessing circuit that stores in the register an objective numerical value; a solution prediction circuit that predicts a partial solution on the basis of the numerical value every time the numerical value is stored in the register, where the partial solution is a value represented by a part of digits constituting a solution to be obtained from the objective numerical value and prediction is made in descending order of digit significance; an intermediate-value calculation circuit that generates an intermediate value by a predetermined calculation using one or more partial solutions predicted by the solution prediction circuit, appends one or more extended sign bits to the intermediate value by sign extension, and stores the intermediate value to which the one or more extended sign bits are appended in the register; a solution generation circuit that sequentially acquires the one or more partial solutions predicted by the solution prediction circuit, and generates a solution on the basis of the one or more partial solutions; and an error detection circuit that compares a value of a sign bit constituting the intermediate value stored in the register with a value of one of the one or more extended sign bits stored in the register, and detects an error when the value of the sign bit is different from the value of the one of the one or more extended sign bits.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 4 illustrates an example of division in which partial quotients are normally determined;

FIG. 8 illustrates an example of square-root calculation in which partial square roots are normally determined;

DESCRIPTION OF EMBODIMENTS

Embodiments will be explained below with reference to the accompanying drawings, wherein like reference numbers refer to like elements throughout.

Figure 1:
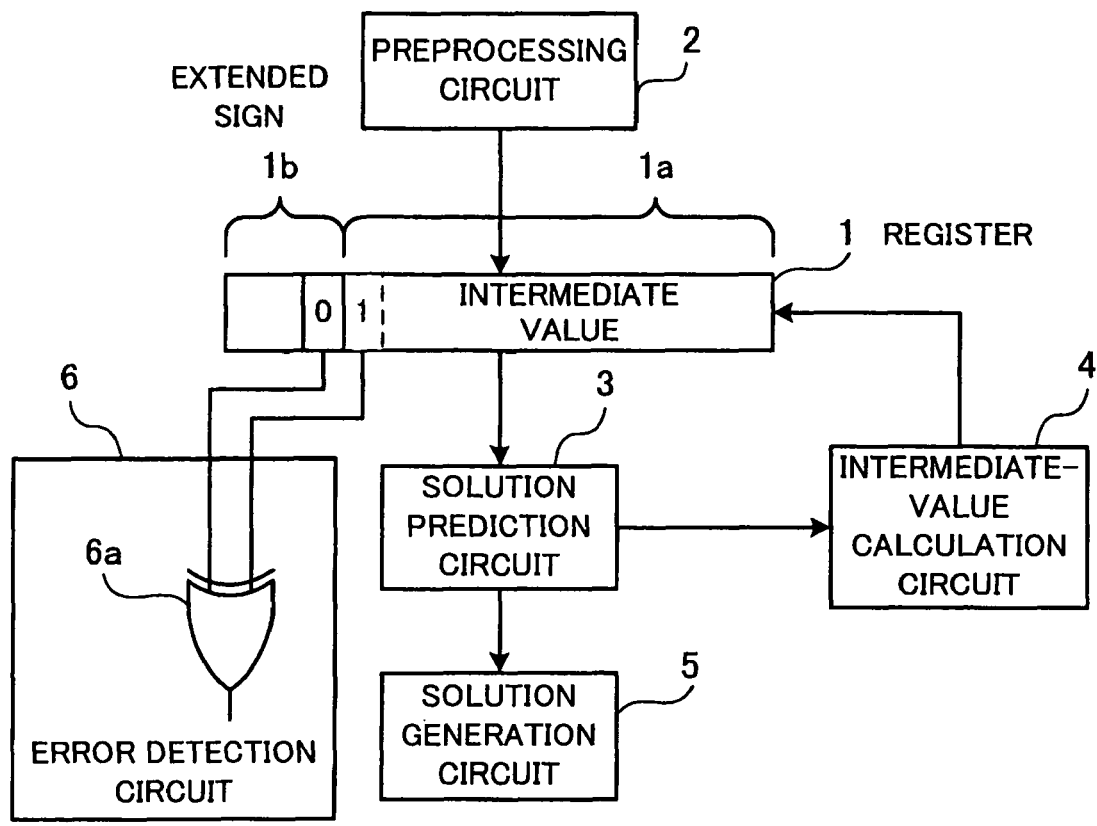
FIG. 1 illustrates an arithmetic circuit according to a first embodiment.

FIG. 1 illustrates an arithmetic circuit according to a first embodiment. The arithmetic circuit of FIG. 1 comprises a register 1, a preprocessing circuit 2, a solution prediction circuit 3, an intermediate-value calculation circuit 4, a solution generation circuit 5, and an error detection circuit 6.

The register 1 in FIG. 1 represents one or more registers. The register 1 stores an intermediate value 1*a* generated by the intermediate-value calculation circuit 4 and an extended sign 1*b* which is appended to the intermediate value 1*a* by sign extension of the intermediate value 1*a*.

The preprocessing circuit 2 stores in the register 1 one or more numerical values on which an arithmetic operation is to be performed. For example, the preprocessing circuit 2 stores in the register 1 a dividend in the case where the register 1 performs division, or a radicand in the case where the register 1 performs square-root calculation. In the case of the division, another register is separately arranged for storing a divisor, and the preprocessing circuit 2 stores the divisor in the separately arranged register.

Every time a numerical value is stored in the register 1, the solution prediction circuit 3 predicts a partial solution on the basis of a numerical value stored in the register 1, where the partial solution is constituted by a value of a part of the digits which represent a solution to be obtained from the one or more numerical values, and is predicted in descending order of digit significance. For example, in the case of division, the solution prediction circuit 3 predicts the partial quotient in descending order of digit significance, where the partial quotient is constituted by a value of a part of the digits which represent a quotient. In the case of square-root calculation, the solution prediction circuit 3 predicts the partial square root in descending order of digit significance, where the partial square root is constituted by a value of a part of the digits which represent a square root.

The intermediate-value calculation circuit 4 generates an intermediate value by a predetermined calculation using one or more partial solutions predicted by the solution prediction circuit 3, and stores in the register 1 a numerical value constituted by the intermediate value and one or more extended sign bits appended to the intermediate value by sign extension.

The solution generation circuit 5 sequentially acquires one or more partial solutions predicted by the solution prediction circuit 3, and generates a solution on the basis of the one or more partial solutions. For example, in the case of division, the solution generation circuit 5 sequentially acquires one or more partial quotients predicted by the solution prediction circuit 3, and generates a quotient. In the case of square-root calculation, the solution generation circuit 5 sequentially acquires one or more partial square roots predicted by the solution prediction circuit 3, and generates a square root.

The error detection circuit 6 compares a value represented by the sign bit of the intermediate value 1*a* stored in the register 1 with a value represented by one of the one or more extended sign bits constituting the extended sign 1*b*, and outputs an error signal when the compared values are different. For example, the error detection circuit 6 is an exclusive OR circuit 6*a* which is connected to the sign bit of the intermediate value 1*a* and one of the one or more extended sign bits, and the exclusive OR circuit 6*a* receives the values of the sign bit and the extended sign bit, and outputs the exclusive OR of the received values. When the output of the exclusive OR circuit 6*a* is "1", the output signal is an error signal.

In the arithmetic circuit configured as above, the preprocessing circuit 2 stores in the register 1 one or more numerical values on which an arithmetic operation is to be performed. Then, the solution prediction circuit 3 predicts a partial solution, and the intermediate-value calculation circuit 4 generates an intermediate value, performs sign extension of the intermediate value (i.e., produces a numerical value constituted by the intermediate value and one or more extended sign bits appended to the intermediate value by sign extension), and stores the sign-extended intermediate value in the register 1.

When the intermediate value is stored in the register 1 as above, the solution prediction circuit 3 newly predicts a partial solution corresponding to a part of digits constituting the solution, where the part of digits have lower significance than one or more digits corresponding to one or more partial solutions which are already predicted by the solution prediction circuit 3. Then, the intermediate-value calculation circuit 4 newly generates an intermediate value on the basis of the newly predicted partial solution, performs sign extension of the newly generated intermediate value, and stores the sign-extended intermediate value in the register 1. Thereafter, prediction of a partial solution and updating of the intermediate value are repeatedly performed until prediction of partial solutions corresponding to a predetermined number of digits of the solution is completed.

The solution generation circuit 5 forms the solution by combining the partial solutions predicted by the solution prediction circuit 3.

In addition, every time an intermediate value is stored in the register 1, the error detection circuit 6 detects an error. When the solution is correctly predicted, the value of the sign bit of the intermediate value is identical to the value of the extended sign bit appended by the sign extension, so that the error detection circuit 6 does not output an error signal. When solution prediction circuit 3 makes an error in the prediction of a partial solution, the intermediate value generated by the intermediate-value calculation circuit 4 also becomes an erroneous value. When an erroneous partial solution is predicted, and the prediction of a partial solution and the generation of an intermediate value are repeated, an overflow occurs in the intermediate value. When an overflow occurs in the intermediate value, the value of the most significant non-sign bit of the intermediate value is stored in the position of the sign bit of the intermediate value. Therefore, the extended sign 1*b* becomes different from the sign bit of the intermediate value, so that the error detection circuit 6 outputs an error signal.

As described above, an error caused by an error in prediction of a partial solution by the solution prediction circuit 3 can be detected with high reliability. Since the error is detected by the error detection circuit 6, which is built in the arithmetic circuit, occurrence or nonoccurrence of an error can be detected at all times while the arithmetic circuit operates. Therefore, even in the case where an error in the prediction of a partial solution rarely occurs, the error detection circuit 6 can output an error signal when the error actually occurs. Since the error signal is outputted from the error detection circuit 6, it is possible to prevent use of an erroneous solution in a post-processing circuit, which normally uses the solution generated by the solution generation circuit 5. Thus, the reliability of the calculation result is improved. In addition, since the error detection circuit 6 detects the error as an overflow of the intermediate value, the cause of the error can be easily determined. Further, since the error detection circuit 6 can be realized, for example, by the exclusive OR circuit 6a, the failure can be detected by addition of a very small amount of logic circuitry.

Although an example of error occurrence due to an error in the prediction of a partial solution by the solution prediction circuit 3 is explained as above, the overflow of the intermediate value can also be produced by other causes. In some cases, the arithmetic circuit does not operate as expected, for example, due to an early failure in an LSI (large scale integrated circuit) such as a fixed failure of a transistor cell or a software failure caused by a factor such as a radiation. The arithmetic circuit of FIG. 1 can detect even the above failures when an overflow of the intermediate value occurs. Therefore, the reliability of a product containing an arithmetic circuit is improved in the case where the arithmetic circuit of FIG. 1 is built in an LSI installed in the product. Thus, the arithmetic circuit of FIG. 1 can contribute to improvement in reliability, availability, and serviceability, which are collectively called RAS.

The arithmetic circuit of FIG. 1 can be used in all of the subtraction-and-shift type arithmetic circuits, which include a divider or a square-root calculator. In the divider and square-root calculator, design of the solution prediction circuit 3 is not easy, and an error is likely to occur in the design of the solution prediction circuit 3. When the arithmetic circuit of FIG. 1 is used, it is possible to perform operational verification of the solution prediction circuit in the subtraction-and-shift type dividers and square-root calculators, and therefore prevent occurrence of a bug caused by a mistake in the design of the solution prediction circuit.

In addition, it is also possible to detect an error in prediction of a partial solution by a logic simulation when the logic simulation is performed by using a circuit equivalent to the arithmetic circuit of FIG. 1. Further, even in the case where the subtraction-and-shift type arithmetic is performed by software, an overflow of the intermediate value can be detected by adding to the software a module performing operations similar to the error detection circuit 6 in FIG. 1.

Hereinbelow, examples of dividers are explained as second and third embodiments, and examples of square-root calculators are explained as fourth and fifth embodiments.

A divider according to a second embodiment enabling detection of a malfunction is explained below. First, a sequence of a subtraction-and-shift type arithmetic using a recurrence equation is explained, and then a reason why a comparison between sign bits realizes the function of a logic checker is explained.

In the following explanations, the dividend is denoted by op1 (operand 1), the divisor is denoted by op2 (operand 2), and the radix is denoted by k (where k=2m, and m is a natural number).

Normally, alignment of the positions of the most significant digits of the divisor op2 and the dividend op1 is performed before operations for division. Hereinafter, the dividend op1 and the divisor op2 which have undergone alignment of the digit positions are respectively referred to as the digit-aligned dividend and digit-aligned divisor, and are respectively denoted by OP1 (OPerand 1) and OP2 (OPerand 2). The digit-aligned dividend OP1 and the digit-aligned divisor OP2 are respectively indicated in the equations.

$$OP1 = op1 \times k^a \text{ (where } a \text{ is an integer)}$$

$$OP2 = op2 \times k^b \text{ (where } b \text{ is an integer)}$$

In the alignment, the digit positions are shifted so that the positions of the most significant digits of the digit-aligned divisor OP2 and the digit-aligned dividend OP1 are matched or the position of the most significant digit of the digit-aligned dividend OP1 is right shifted by one digit from the position of the most significant digit of the digit-aligned divisor OP2.

The subtraction-and-shift type arithmetic sequence for obtaining the quotient and the remainder is defined by the recurrence equation (1).

$$r(n) = k \times r(n-1) - q(n-1) \times OP2$$

$$r(0) = OP1 \quad (1)$$

At this time, q(n−1) is an integer selected to satisfy the inequality criterion |r(n)|<OP2. Although a plurality of candidates for q(n−1) can exist in the range satisfying the condition |q(n−1)|<k, an arbitrary one of the candidates may be selected. In the recurrence equation (1), r(n) is called the n-th intermediate remainder, and q(n−1) is called the partial quotient corresponding to the n-th significant digit.

The restoring algorithm is a calculation algorithm in which the integer indicating the partial quotient q(n−1) is selected so that the intermediate remainder r(n) is always zero or positive. The non-restoring algorithm is a calculation algorithm in which the intermediate remainder r(n) is allowed to be negative. The SRT algorithm is a calculation algorithm in which the intermediate remainder r(n) is allowed to be negative, and the determination whether to satisfy the inequality criterion |r(n)|<OP2 is made on the basis of only a few significant bits of the intermediate remainder r(n).

That is, according to the restoring algorithm, the intermediate remainder r(n) is always limited to zero or a positive number. In this case, a candidate for each partial quotient q(n−1) is automatically and uniquely determined to be zero or a positive number. On the other hand, according to the non-restoring algorithm or the SRT algorithm, the intermediate remainder r(n) is allowed to be negative. In this case, each partial quotient q(n−1) can be negative, and a plurality of candidates for each partial quotient q(n−1) can exist.

When the quotient constituted by the first to n-th significant digits obtained in a process for division of the digit-aligned dividend OP1 by the digit-aligned divisor OP2 is denoted by Q(n), the quotient Q(n) can be expressed by using the partial quotients q(0), q(1), . . . , q(n−2), and q(n−1) as $$Q(n) = q(0) \times k^{n-1} + q(1) \times k^{n-2} + \ldots + q(n-2) \times k + q(n-1) \quad (2)$$

The following equations are derived from the equation (1).

$$\begin{aligned} r(n) &= k \times r(n-1) - q(n-1) \times OP2 \quad (3) \\ &= k \times \{k \times r(n-2) - q(n-2) \times OP2\} - q(n-1) \times OP2 \\ &= k^2 \times r(n-2) - \{k \times q(n-2) + q(n-1)\} \times OP2 \\ &= k^3 \times r(n-3) - \left\{ \begin{array}{l} k^2 \times q(n-3) + \\ k \times q(n-2) + q(n-1) \end{array} \right\} \times OP2 \end{aligned}$$

-continued $$= k^n \times r(0) - \left\{ \begin{array}{c} k^{n-1} \times q(0) + \\ k^{n-2} \times q(1) + \ldots + k^2 \times q(n-3) + \\ k \times q(n-2) + q(n-1) \end{array} \right\} \times OP2$$

$$= k^n \times r(0) - Q(n) \times OP2$$

The following equation (4) is obtained by solving the equation (3) for r(0), and substituting the equation $OP2=op2 \times k^b$ into the equation solved for r(0). Since $OP2=op2 \times k^b$, the equation (3) is equivalent to the equation (4). (The equivalence is indicated by <->.)

<->

$r(0)=\{Q(n) \times OP2 + r(n)\}/k^n$ $= \{Q(n) \times k^b/k^n\} \times op2 + r(n)/k^n$ \hfill (4)

In addition, the following equation (5) is obtained by replacing r(0) with OP1 in the equation (4), and substituting the equation $OP1=op1 \times k^a$ into the equation (4). Since $r(0)=OP1=op1 \times k^a$, the equation (4) is equivalent to the equation (5).

<->

$op1=\{Q(n) \times k^b/k^{n+a}\} \times op2 + r(n)/k^{n+a}$ \hfill (5)

In the case where the dividend op1 is divided by the divisor op2, the quotient and the remainder satisfy the relationship op1=(quotient)×op2+(remainder). In consideration of the equations (3), (4), and (5), the quotient can be expressed as $Q(n) \times k^b/k^{n+a}$, and \hfill (6)

the remainder can be expressed as $r(n)/k^{n+a}$. \hfill (7)

In the case of fixed point division, normally, an arithmetic operation in accordance with the recurrence equation (1) is repeated until the right side of either of the equations (6) and (7) becomes non-integer. In the case of floating point division, an arithmetic operation in accordance with the recurrence equation (1) is repeated until the number of digits of the quotient Q(n) reaches a necessary number, which is equal to the total number of significant digits and additional digits. The necessary significant digits include, for example, 23 bits of the fraction part of the normalized representation of Q(n) (in the case of the single-precision floating-point format in accordance with IEEE 754 standard), or 52 bits of the fraction part of the normalized representation of the quotient Q(n) (in the case of the double-precision floating-point format in accordance with IEEE 754 standard). The additional bits include one bit for the so-called hidden bit (in the integer part of the normalized representation of the quotient Q(n)) and a few less significant bits for rounding. (The rounding means representing a numerical value by an approximate value in accordance with a certain rule. For example, digits less significant than the significant digits are rounded off.)

In logic design for performing the above subtraction-and-shift type arithmetic, caution is required in the operations in accordance with the recurrence equation (1) and the selection of the integer q(n−1) satisfying the inequality criterion |r(n)|<OP2.

In particular, in the logic for determining whether to satisfy the inequality criterion |r(n)|<OP2, a logic error is likely to occur and is difficult to find. In the 1990s, the SRT algorithm was used in the floating-point division performed in the CPU (central processing unit) in the personal computer. However, a fact that an error occurs in a calculation result in response to a specific input value in a product was found after shipment, and the product was recalled. The cause of the above error was an error in the determination whether to satisfy the inequality criterion |r(n)|<OP2. Even in the case where the frequency of occurrence of the error in the calculation result is small, use in the fields of science and technology is impossible unless the correctness of the calculation result is guaranteed. Therefore, it is essential, to build in a circuit which prevents an erroneous calculation result from being passed to a subsequent processing stage.

According to the second embodiment, when an error occurs in the determination whether to satisfy the inequality criterion |r(n)|<OP2, an error in the determination is detected, and an error signal is outputted. A logic for detecting an error in the determination whether to satisfy the inequality criterion |r(n)|<OP2 is explained below.

First, operations performed after an error occurs in the determination whether to satisfy the inequality criterion |r(n)|<OP2 are considered below.

When an error occurs in the determination whether to satisfy the inequality criterion |r(n)|<OP2, an erroneous partial quotient q(n−1) is selected, and thereafter the condition |r(n)|≧OP2 continues, so that the intermediate remainder never converges as indicated below. Since the integer q(n−1) satisfies |q(n−1)|≧k, when |r(n)|≧OP2, $$r(n+1) = |k \times r(n) - q(n) \times OP2| \geq |k \times (\pm OP2) - q(n) \times OP2| \quad (8)$$

$$= |\pm k - q(n)| \times OP2 \geq OP2.$$

That is the condition |r(n+1)|≧OP2 necessarily exists when the condition |r(n)|≧OP2 exists. In other words, errors successively occur (i.e., successively obtained intermediate remainders remain in a diverging condition) after an error occurs in the determination whether to satisfy the inequality criterion |r(n)|<OP2.

In many cases, the intermediate remainder overflows while the arithmetic operation in accordance with the recurrence equation (1) is repeated under the diverging condition. Since the overflow of the intermediate remainder means that the value of the intermediate remainder becomes too large to be stored in the digits provided for the intermediate remainder in the arithmetic circuit, the value stored as the intermediate remainder in the arithmetic circuit becomes erroneous because of the loss of some significant bits caused by the overflow. The occurrence of the erroneous intermediate remainder leads successive generation of erroneous intermediate remainders and erroneous intermediate quotients. Consequently, when an error occurs in the determination whether to satisfy the inequality criterion |r(n)|<OP2, intermediate remainders in a diverging condition are successively generated, or erroneous intermediate remainders and erroneous intermediate quotients are successively generated. In either case, it is impossible to obtain the correct value of the quotient under the above situation.

In consideration of the above circumstances, according to the second embodiment, an error in the determination whether to satisfy the inequality criterion |r(n)|<OP2 is detected by detecting an overflow of the intermediate remainder from among the above erroneous states. In the following explanations, it is assumed that the arithmetic circuit is realized by a digit circuit having a function of sign extension. The sign extension is an operation which is performed when a bit series representing a signed number and having a length shorter than the bit width of a storage region, and in which one or more vacant digits in the storage region are filled with one or more appropriate bits while preserving the identity of the signed number. In the present embodiment, the sign extension is assumed to be performed by filling one or more vacant digits located on the significant side with one or more bits each having the same value as the value of the sign bit.

As mentioned before, before the arithmetic operation, alignment of the positions of the most significant digits of the divisor and the dividend is performed. In the alignment, the digit positions are shifted so that the positions of the most significant digits of the digit-aligned divisor OP2 and the digit-aligned dividend OP1 (=r(0)) are matched or the position of the most significant digit of the digit-aligned dividend OP1 (=r(0)) is right shifted by one digit from the position of the most significant digit of the digit-aligned divisor OP2. Thereafter, arithmetic operations are performed while satisfying the inequality criterion $|r(n)|<OP2$, as long as the arithmetic operations are logically correct. Therefore, the significance of the most significant digit of the intermediate remainder r(n) does not exceed the significance of the most significant digit of the digit-aligned divisor OP2, and the position of the sign bit of the digit-aligned divisor OP2 matches the position of the sign bit of the intermediate remainder r(n) as long as the arithmetic operations are logically correct. Since the one or more bits each having the same value as the value of the sign bit of the intermediate remainder r(n) are located on the significant side of the intermediate remainder r(n) by the sign extension, the value of the sign bit of the intermediate remainder r(n) can be normally expected to be the same as the value of each bit located on the significant side of the sign bit of the intermediate remainder r(n). If the value of the sign bit of the intermediate remainder r(n) is found to be different from the value of a bit located on the significant side of the sign bit of the intermediate remainder r(n), it is possible to determine that the data overflows into the position of the sign bit.

In the case where the value of the sign bit of the intermediate remainder r(n) (which is located immediately left-adjacent to the most significant non-sign bit of the intermediate remainder r(n), and is the rightmost one of the sign bits) is denoted by s0, and the value of the one of the extended sign bits immediately right-adjacent to the above sign bit (i.e., the rightmost one of the extended sign bits) is denoted by s1, the logic failure can be detected on the basis of only the exclusive OR of the above two sign bits (s0 XOR s1), because (s0 XOR s1)=0 when no error occurs, and (s0 XOR s1)=1 when an error occurs. Thus, the logic circuit added to the arithmetic circuit as above and used for detection of an error in determination whether to satisfy the inequality criterion $|r(n)|<OP2$ can be realized by only one exclusive OR circuit (XOR gate).

Figure 2:
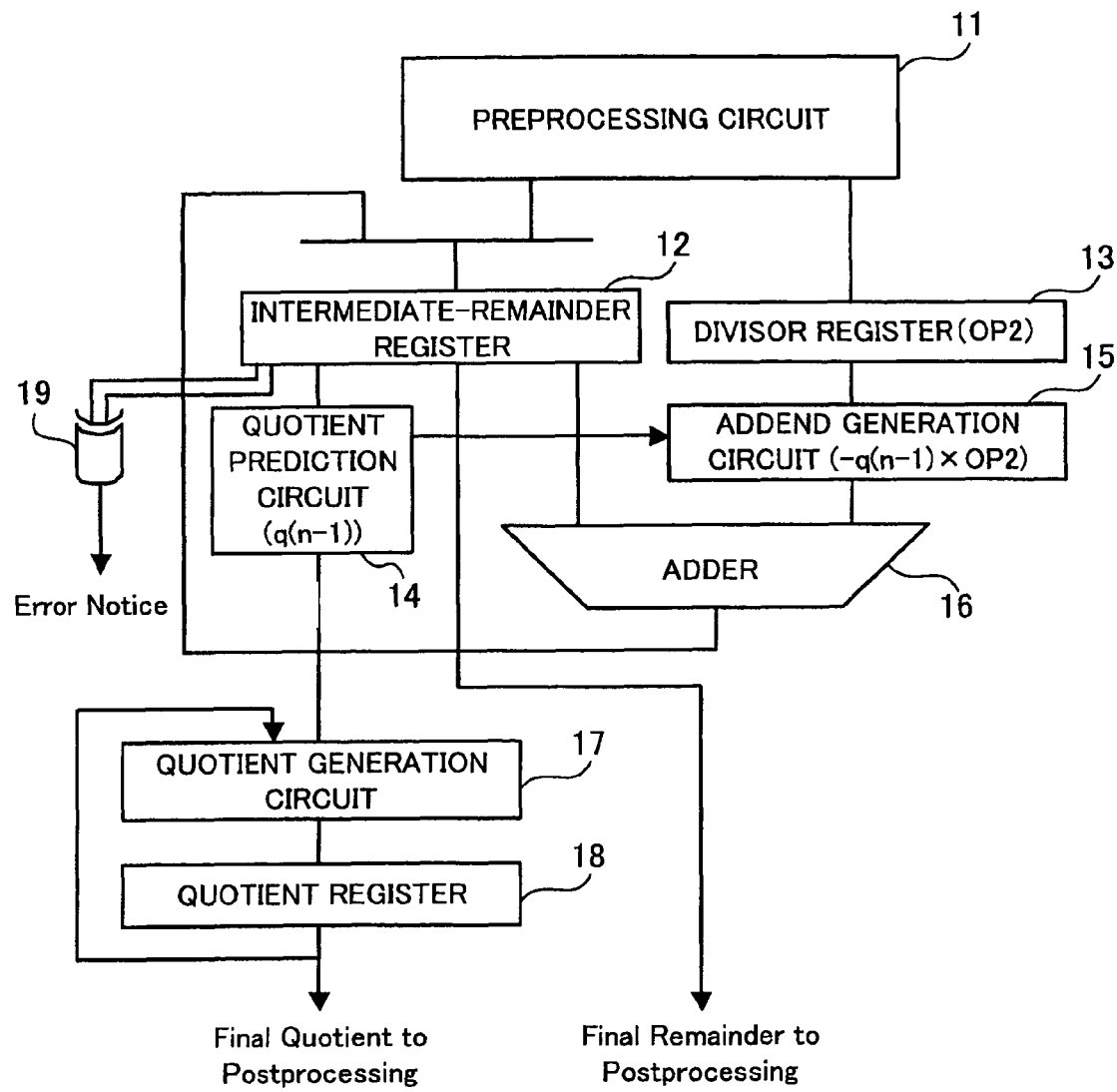
FIG. 2 illustrates a divider according to a second embodiment.

FIG. 2 illustrates a divider according to the second embodiment. The divider of FIG. 2 comprises a preprocessing circuit 11, an intermediate-remainder register 12, a divisor register 13, a quotient prediction circuit 14, an addend generation circuit 15, an adder 16, a quotient generation circuit 17, a quotient register 18, and an exclusive OR circuit 19.

The preprocessing circuit 11 performs preprocessing such as the alignment of the digit positions of the dividend and the divisor. The preprocessing circuit 11 has output signal lines respectively connected to the intermediate-remainder register 12 and the divisor register 13, and stores the digit-aligned dividend OP1 in the intermediate-remainder register 12 and the digit-aligned divisor OP2 in the divisor register 13.

The intermediate-remainder register 12 is a register for storing the intermediate remainder. For example, a register having a bit width of 64 bits can be used as the intermediate-remainder register 12 for storing the intermediate remainder in the double-precision floating-point format in accordance with IEEE 754 standard. The intermediate-remainder register 12 has output signal lines respectively connected to the quotient prediction circuit 14, the adder 16, and a circuit (not depicted) which performs post-processing of a final remainder obtained as a result of division performed by the divider of FIG. 2.

The quotient prediction circuit 14 predicts a partial quotient q(n−1) on the basis of the intermediate remainder held in the intermediate-remainder register 12 and the digit-aligned divisor OP2 stored in the divisor register 13. (Although the connection between the divisor register 13 and the quotient prediction circuit 14 is not indicated in FIG. 2, the quotient prediction circuit 14 can refer to the divisor register 13 for the above prediction using the digit-aligned divisor OP2.) Specifically, the quotient prediction circuit 14 determines the partial quotient q(n−1) so that the digit-aligned divisor OP2 and the intermediate remainder obtained by the recurrence equation (1) satisfy the inequality criterion $|r(n)|<OP2$. However, when the quotient prediction circuit 14 has a logic failure and a combination of the digit-aligned divisor OP2 and an intermediate remainder which make the logic failure evident occurs, or when a fixed failure of a transistor cell or a software error caused by a factor such as a radiation occurs, the quotient prediction circuit 14 can predict a partial quotient q(n−1) which leads to violation of the inequality criterion $|r(n)|<OP2$. The quotient prediction circuit 14 has output signal lines respectively connected to the addend generation circuit 15 and the quotient generation circuit 17.

The addend generation circuit 15 calculates a value (addend) to be added to the intermediate remainder. Specifically, the addend generation circuit 15 calculates a product of the partial quotient q(n−1) predicted by the quotient prediction circuit 14 and the digit-aligned divisor OP2 acquired from the divisor register 13, and multiplies the product by −1 so as to invert the sign of the product. The addend generation circuit 15 has an output signal line connected to the adder 16, so that the output of the addend generation circuit 15 is supplied to the adder 16.

The adder 16 adds inputted values. Specifically, the adder 16 adds the addend calculated by the addend generation circuit 15 to the intermediate remainder stored in the intermediate-remainder register 12. The adder 16 has an output signal line connected to the intermediate-remainder register 12, so that the result of the addition outputted from the adder 16 is stored as an intermediate remainder in the intermediate-remainder register 12.

When both of the divisor and the partial quotient are positive, the addend obtained by the addend generation circuit 15 is a negative value. In this case, the addition performed by the adder 16 is an operation of subtracting from the intermediate remainder the absolute value of the addend obtained by the addend generation circuit 15. According to the present embodiment, negative numbers are represented by two's complements. The two's complement of a binary number is obtained by negation (Boolean complementation or inversion) of every bit of the binary number and addition of one. That is, the addend generation circuit 15 outputs a calculation result in the two's complement representation when the calculation result is negative. In this case, the adder 16 adds the calculation result of the addend generation circuit 15 to the intermediate remainder, and ignores the carry from the most significant bit in the added result. Thus, addition of a negative number is realized.

The quotient generation circuit 17 generates a value of a quotient on the basis of one or more partial quotients which are already generated by the quotient prediction circuit 14, and outputs the generated value of the quotient. The quotient generation circuit 17 has an output signal line connected to the quotient register 18, and the value of the quotient generated by the quotient generation circuit 17 is written in the quotient register 18. Specifically, every time a partial quotient is newly predicted by the quotient prediction circuit 14, the quotient generation circuit 17 reads in the value of the quotient currently stored in the quotient register 18, shifts the value of the quotient to the left by a predetermined number of digits, adds the newly predicted partial quotient to the predetermined number of digits which are vacated by the shift, and writes in the quotient register 18 the value of the quotient to which the newly predicted partial quotient is added.

The quotient register 18 is a register for storing a value of the quotient. The quotient register 18 has output signal lines respectively connected to the quotient generation circuit 17 and a circuit (not depicted) which performs post-processing of the final value of the quotient (final quotient).

The exclusive OR circuit 19 is connected to the intermediate-remainder register 12. Specifically, an output signal line of the sign bit of the intermediate remainder stored in the intermediate-remainder register 12 and an output signal line of an extended sign bit located on the significant side of the sign bit of the intermediate remainder in the intermediate-remainder register 12 are connected to the inputs of the exclusive OR circuit 19.

Figure 3:
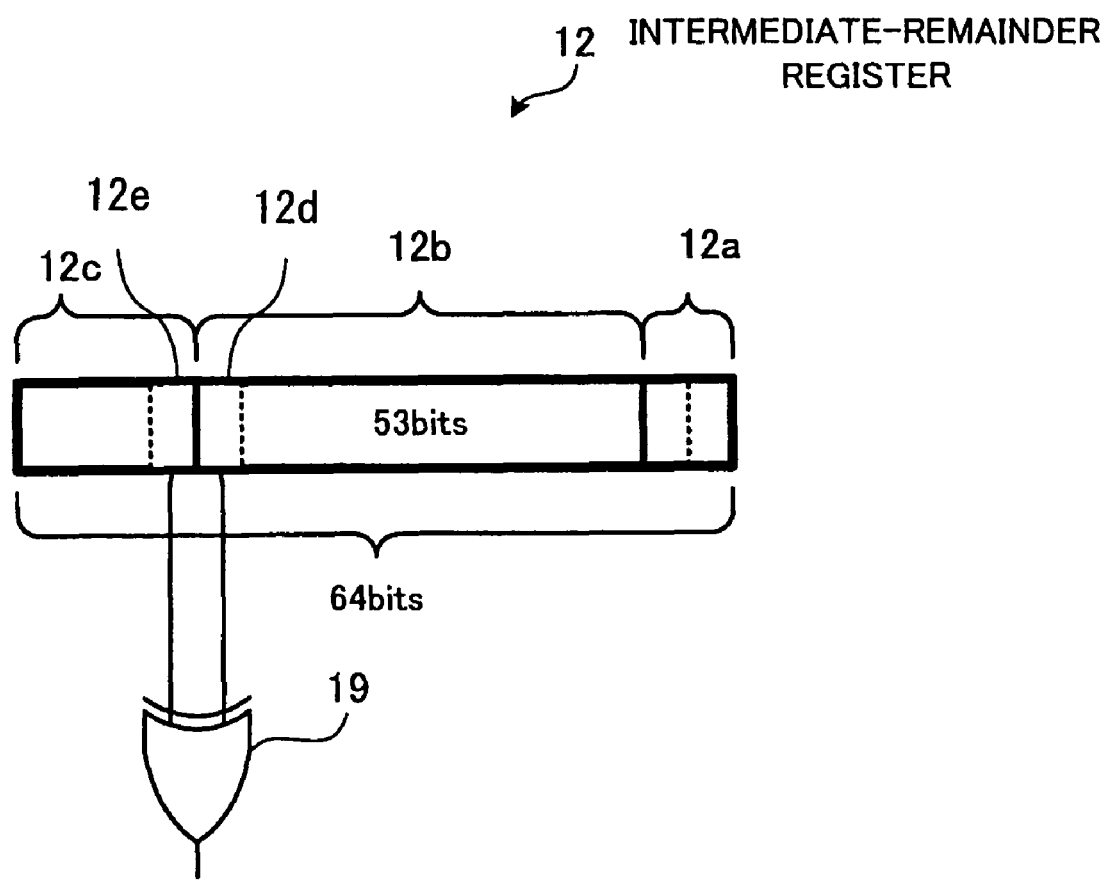
FIG. 3 illustrates an example of connection of an intermediate-remainder register and an exclusive OR circuit.

FIG. 3 illustrates an example of connection of the intermediate-remainder register and the exclusive OR circuit. In the example of FIG. 3, the intermediate-remainder register 12 has a width of 64 bits. In the intermediate-remainder register 12, a bit series 12a for rounding, a bit series 12b of the intermediate remainder, and an extended sign-bit series 12c are stored in ascending order of significance.

The bit series 12a for rounding includes a few less significant bits (e.g., two bits) in the intermediate-remainder register 12, and indicates a value used for rounding the intermediate remainder.

The bit series 12b is located on the significant side of the bit series 12a for rounding. Initially, the digit-aligned dividend OP1 is stored in the bit series 12b. Thereafter, every time the operation of the adder 16 is performed, the result of the operation is stored as the intermediate remainder in the bit series 12b. For example, 53 bits in the intermediate-remainder register 12 are used for the bit series 12b. The most significant bit of the bit series 12b is the sign bit 12d. The sign bit 12d indicates a value indicating the sign of the intermediate remainder. The sign bit is "0" when the intermediate remainder is positive, and the sign bit is "1" when the intermediate remainder is negative.

The extended sign-bit series 12c is located on the significant side of the bit series 12b. The extended sign bits are stored in the extended sign-bit series 12c. Every extended sign bit is "0" when the intermediate remainder is positive, and every extended sign bit is "1" when the intermediate remainder is negative.

In the example of FIG. 3, the sign bit of the intermediate remainder stored in the intermediate-remainder register 12 and the least significant one 12e of the extended sign bits 12c in the intermediate-remainder register 12 are connected to the inputs of the exclusive OR circuit 19, so that the exclusive OR of the two bits inputted into the exclusive OR circuit 19 is calculated by the exclusive OR circuit 19. The exclusive OR circuit 19 outputs "0" when the two inputted bits are identical, and "1" when the two inputted bits are different.

According to the present embodiment, the operations for division are performed by using the divider having the construction illustrated in FIGS. 2 and 3. The operations of the divider according to the second embodiment are summarized below.

In order to perform the operations for division, the dividend op1 and the divisor op2 are inputted into the preprocessing circuit 11. Then, the preprocessing circuit 11 performs alignment of the digit positions of the dividend and the divisor, so that digit-aligned dividend OP1 and the digit-aligned divisor OP2 are generated. The preprocessing circuit 11 stores the digit-aligned dividend OP1 in the intermediate-remainder register 12, and the digit-aligned divisor OP2 in the divisor register 13. Subsequently, the quotient prediction circuit 14 predicts a partial quotient corresponding to the most significant digit obtained from the digit-aligned dividend OP1 stored in the intermediate-remainder register 12, and inputs the predicted partial quotient into the addend generation circuit 15 and the quotient generation circuit 17.

The quotient generation circuit 17 stores in the quotient register 18 the partial quotient which is first predicted by the quotient prediction circuit 14, as is.

In addition, the addend generation circuit 15 calculates a product of the inputted partial quotient and the digit-aligned divisor OP2, inverts the sign of the product to generate an addend, and inputs the addend into the adder 16. The adder 16 adds the addend calculated by the addend generation circuit 15 to the digit-aligned dividend OP1 which is initially stored in the intermediate-remainder register 12, and the contents of the intermediate-remainder register 12 is updated from the digit-aligned dividend OP1 to an intermediate remainder.

When the contents of the intermediate-remainder register 12 are updated, the quotient prediction circuit 14 newly predicts a partial quotient corresponding to the next significant digit, and inputs the predicted partial quotient into the addend generation circuit 15 and the quotient generation circuit 17. Then, the quotient generation circuit 17 shifts the value stored in the quotient register 18 to the left, adds the newly predicted partial quotient to the digits located on the less significant side of the shifted value, and updates the contents of the quotient register 18 with the value to which the newly predicted partial quotient is added.

Subsequently, the addend generation circuit 15 calculates a product of the inputted partial quotient and the digit-aligned divisor OP2, inverts the sign of the product to generate an addend, and inputs the addend into the adder 16. The adder 16 adds the addend calculated by the addend generation circuit 15 to the intermediate remainder stored in the intermediate-remainder register 12, and the contents of the intermediate-remainder register 12 is updated with the output of the adder 16.

Thereafter, prediction of a partial quotient and operations on the basis of the predicted partial quotient are repeatedly performed until a final quotient having a desired number of digits is obtained. Thus, finally, the quotient and the remainder obtained by the division of the digit-aligned dividend OP1 by the digit-aligned divisor OP2 are respectively stored in the quotient register 18 and the intermediate-remainder register 12.

In the above division process, the value of the least significant bit 12e in the extended sign-bit series 12c is always identical to the value of the sign bit 12d unless the quotient prediction circuit 14 makes an error in the prediction of a partial quotient.

FIG. 4 illustrates an example of division in which partial quotients are normally determined. In the example of FIG. 4, for simplicity, the handled numbers are 8-bit binary numbers, and assumed to have already undergone the alignment of the digit positions, where the digit-aligned dividend OP1 is "+11000000," and the digit-aligned divisor OP2 is "+10000001." In this case, the divider performs the division OP1÷OP2=(+11000000)÷(+10000001).

In FIG. 4, the division process is indicated in the left half, and the contents of the intermediate-remainder register in respective stages during the division process are indicated in the right half. In the illustrated bits of the intermediate-remainder register in each stage, the leftmost bit is the aforementioned least significant one of the extended sign bits, the second bit from the left is the aforementioned sign bit of the intermediate remainder, and the eight bits illustrated on the right side of the sign bit indicate the non-sign bits of the intermediate remainder.

The quotient prediction circuit 14 predicts the partial quotients on a digit-by-digit basis in descending order of digit significance. When the intermediate remainder is positive, both of the sign bit and the extended sign bit indicated on the significant side of the sign bit are zero. When the intermediate remainder is negative, both of the sign bit and the extended sign bit are one. In either case, the sign bit and the extended sign bit are identical as long as the prediction of the partial quotient is normally performed.

When the quotient prediction circuit 14 has a logic failure, or when a fixed failure of a transistor cell or a software error caused by a factor such as a radiation occurs, the quotient prediction circuit 14 can make an error in prediction of a partial quotient during the division process, i.e., the quotient prediction circuit 14 can predict a partial quotient $q(n-1)$ which leads to violation of the inequality criterion $|r(n)|<OP2$. When the inequality criterion $|r(n)|<OP2$ is violated, an overflow of the intermediate remainder occurs, so that a numerical value different from the sign bit of the intermediate remainder is set in the position of the sign bit 12d, to which the sign bit of the intermediate remainder is to be set. Therefore, the value of the sign bit becomes different from the value of the least significant one of the extended sign bits.

Figure 5:
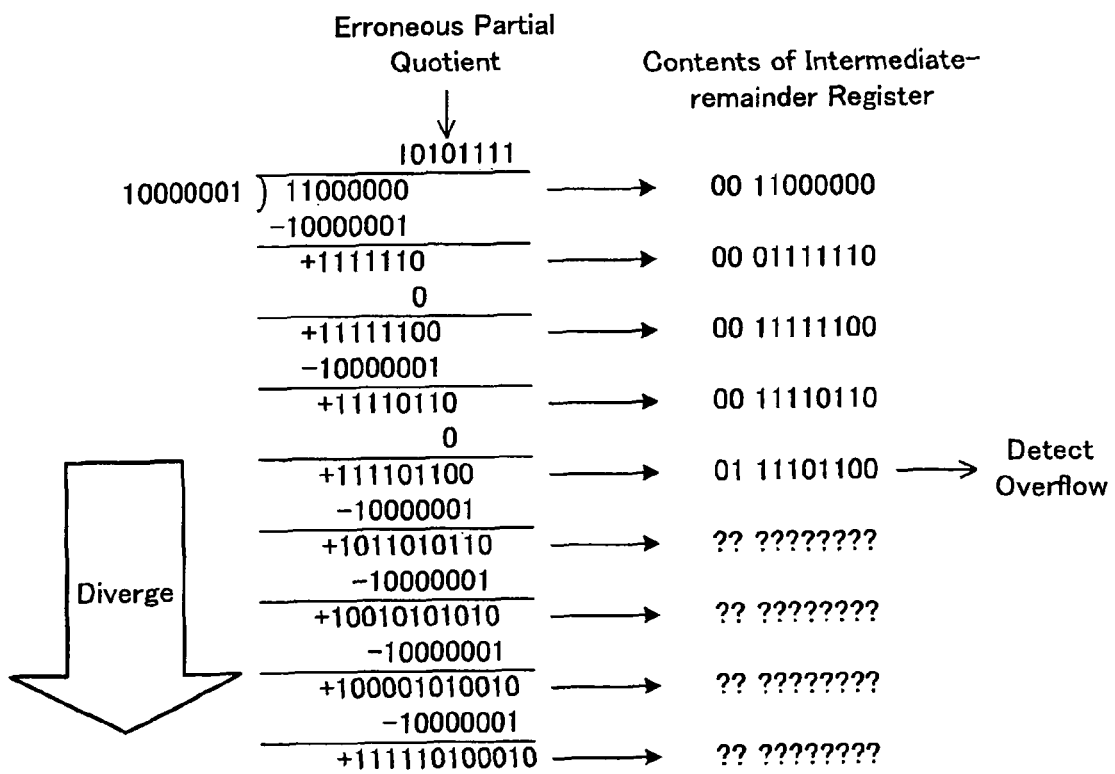
FIG. 5 illustrates an example of division in which a partial quotient is erroneously determined.

FIG. 5 illustrates an example of division in which a partial quotient is erroneously determined. In the example of FIG. 5, an error occurs in the determination of the partial quotient $q(3)$ corresponding to the fourth significant digit. In this determination, the partial quotient $q(3)$ is determined to be one in order to satisfy the inequality criterion $|r(4)|<OP2$. However, the quotient prediction circuit 14 erroneously determines the partial quotient to be zero in the example of FIG. 5.

The intermediate remainder calculated by using the above erroneous partial quotient corresponding to the fourth significant digit becomes greater than the digit-aligned divisor OP2. In the example of FIG. 5, the intermediate remainder calculated by use of the erroneous partial quotient corresponding to the fourth significant digit becomes a numerical value represented by nine digits, i.e., the number of the digits exceeds the number of bits of the intermediate remainder stored in the intermediate-remainder register, so that the intermediate remainder diverges and an overflow occurs. As a result, the value of the most significant digit of the intermediate remainder calculated with the overflow is set in the position of the sign bit, so that the value of the sign bit becomes "1" although the intermediate remainder is positive. At this time, the least significant one of the extended sign bits is still "0." That is, the value of the sign bit becomes different from the value of the least significant one of the extended sign bits. The identity or difference in the value between the sign bit and the least significant one of the extended sign bits is detected by the exclusive OR circuit 19. When the output signal of the exclusive OR circuit 19 is "1," the output signal is a notice of an error.

Incidentally, it is unknown how operations for calculation proceed after the intermediate remainder once diverges. For example, it is unknown whether or not the operations for calculation proceed as indicated in the right half of FIG. 5.

As explained above, according to the second embodiment, the overflow of the intermediate remainder can be detected by merely connecting the exclusive OR circuit 19 to the intermediate-remainder register 12. Therefore, when the quotient prediction circuit 14 makes an error in prediction of a partial quotient, it is possible to issue a notice of the error. Since the function of detecting an error in prediction of a partial quotient can be realized by the simple addition of the exclusive OR circuit 19, the increase in the scale of the arithmetic circuit by the realization of the function can be minimized.

A divider according to a third embodiment using a CSA (carry save adder) is explained below.

Figure 6:
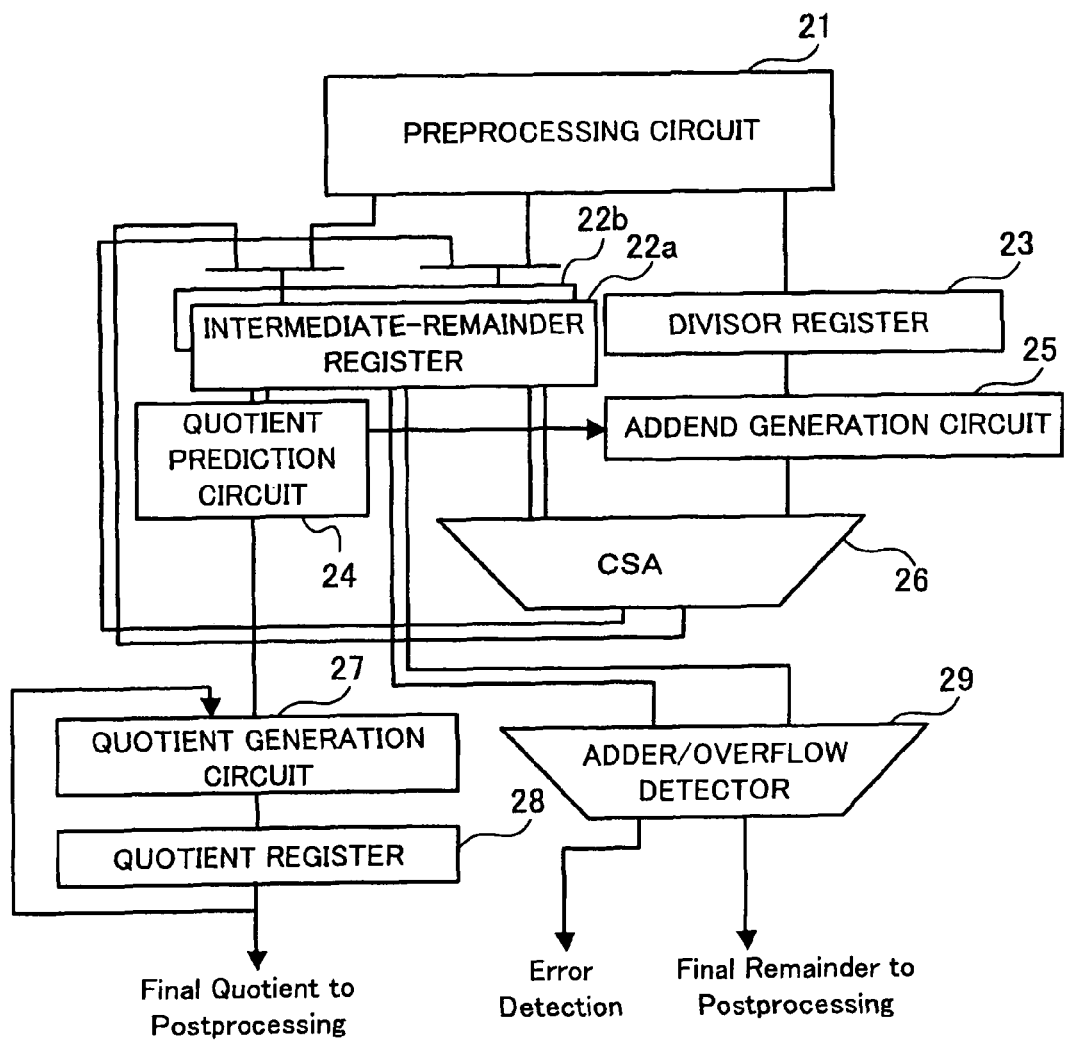
FIG. 6 illustrates a divider according to a third embodiment.

FIG. 6 illustrates a divider according to the third embodiment. The divider of FIG. 6 comprises a preprocessing circuit 21, intermediate-remainder registers 22a and 22b, a divisor register 23, a quotient prediction circuit 24, an addend generation circuit 25, a CSA (carry save adder) 26, a quotient generation circuit 27, a quotient register 28, and an adder/overflow detector 29.

The preprocessing circuit 21 performs preprocessing such as the alignment of the digit positions of the dividend and the divisor. The preprocessing circuit 21 has output signal lines respectively connected to the intermediate-remainder registers 22a and 22b and the divisor register 23, and stores the digit-aligned dividend OP1 in the intermediate-remainder register 22a and the digit-aligned divisor OP2 in the divisor register 23.

The intermediate-remainder registers 22a and 22b are registers provided for separately storing sums and carries. For example, the values of sums are stored in the intermediate-remainder register 22a, and the values of carries are stored in the intermediate-remainder register 22b. The intermediate-remainder registers 22a and 22b have output signal lines respectively connected to the quotient prediction circuit 24, the CSA 26, and the adder/overflow detector 29.

The quotient prediction circuit 24 predicts a partial quotient $q(n-1)$ on the basis of the intermediate remainder stored in the intermediate-remainder registers 22a and 22b (i.e., on the basis of the sums and the carries which are separately stored in the intermediate-remainder registers 22a and 22b and indicate the intermediate remainder). The quotient prediction circuit 24 has output signal lines respectively connected to the addend generation circuit 25 and the quotient generation circuit 27. (Although the connection between the divisor register 23 and the quotient prediction circuit 24 is not indicated in FIG. 6, the quotient prediction circuit 24 can refer to the divisor register 23 for the above prediction using the digit-aligned divisor OP2.)

The addend generation circuit 25 calculates a value (addend) to be added to the intermediate remainder. Specifically, the addend generation circuit 25 calculates a product of the partial quotient $q(n-1)$ predicted by the quotient prediction circuit 24 and the digit-aligned divisor OP2 acquired from the divisor register 23, and multiplies the product by −1 so as to invert the sign of the product. The addend generation circuit 25 has, an output signal line connected to the CSA 26, and the output of the addend generation circuit 25 is supplied to the CSA 26.

The CSA 26 performs processing for addition on the basis of inputted values, and outputs an intermediate remainder represented by sums and carries, which are separated. The CSA 26 obtains a sum and a carry for each digit, and separately outputs for each digit the carry from the digit and the sum without the carry. Specifically, the CSA 26 performs processing for addition on the basis of the addend calculated by the addend generation circuit 25 and the sums and the carries which are stored in the intermediate-remainder registers 22a and 22b and indicate the intermediate remainder. The CSA 26 has output signal lines connected to the intermediate-remainder registers 22a and 22b, so that the sums and the carries obtained by the processing for addition performed by the CSA 26 are respectively stored in the intermediate-remainder registers 22a and 22b.

The quotient generation circuit 27 generates a value of a quotient on the basis of one or more partial quotients which are already generated by the quotient prediction circuit 24, and outputs the generated value of the quotient. The quotient generation circuit 27 has an output signal line connected to the quotient register 28.

The quotient register 28 is a register for storing a value of the quotient. The quotient register 28 has output signal lines respectively connected to the quotient generation circuit 27 and a circuit (not depicted) which performs post-processing of the final value of the quotient (final quotient).

The adder/overflow detector 29 acquires the sums and the carries from the intermediate-remainder registers 22a and 22b, performs the processing for addition on the basis of the sums and the carries, and generates a remainder. The remainder calculated by the adder/overflow detector 29 is an intermediate remainder before the division process is completed. When the division process is completed, the adder/overflow detector 29 calculates a final remainder and outputs the final remainder to a circuit (not depicted) which performs post-processing.

In addition, the adder/overflow detector 29 performs processing for detecting an overflow. Specifically, the adder/overflow detector 29 determines whether or not the number of digits of the calculated remainder including the sign bit exceeds a predetermined number, and outputs an error detection signal when yes is determined.

According to the third embodiment, the operations for division are performed by using the divider having the construction illustrated in FIG. 6. The operations of the divider according to the third embodiment are summarized below.

In order to perform the operations for division, the dividend op1 and the divisor op2 are inputted into the preprocessing circuit 21. Then, the preprocessing circuit 21 performs alignment of the digit positions of the dividend and the divisor, so that digit-aligned dividend OP1 and the digit-aligned divisor OP2 are generated. The preprocessing circuit 21 stores the digit-aligned dividend OP1 in the intermediate-remainder register 22a, and the digit-aligned divisor OP2 in the divisor register 23. Subsequently, the quotient prediction circuit 24 predicts a partial quotient corresponding to the most significant digit obtained from the digit-aligned dividend OP1 stored in the intermediate-remainder register 22a, and inputs the predicted partial quotient into the addend generation circuit 25 and the quotient generation circuit 27. The quotient generation circuit 27 stores in the quotient register 28 the partial quotient which is first predicted by the quotient prediction circuit 24, as is. In addition, the addend generation circuit 25 calculates a product of the inputted partial quotient and the digit-aligned divisor OP2, inverts the sign of the product to generate an addend, and inputs the addend into the CSA 26. The CSA 26 adds the addend calculated by the addend generation circuit 25 to the digit-aligned dividend OP1 which is initially stored in the intermediate-remainder register 22a, and outputs the calculation result represented by sums and carries. At this time, the sums are written in the intermediate-remainder register 22a, and the carriers are written in the intermediate-remainder register 22b. When the contents of the intermediate-remainder registers 22a and 22b are updated, the quotient prediction circuit 24 newly predicts a partial quotient corresponding to the next significant digit on the basis of the contents of the intermediate-remainder registers 22a and 22b, and inputs the predicted partial quotient into the addend generation circuit 25 and the quotient generation circuit 27. Then, the quotient generation circuit 27 shifts the value stored in the quotient register 28 to the left, adds the newly predicted partial quotient to the digits located on the less significant side of the shifted value, and updates the contents of the quotient register 28 with the value to which the newly predicted partial quotient is added. Subsequently, the addend generation circuit 25 calculates a product of the inputted partial quotient and the digit-aligned divisor OP2, inverts the sign of the product to generate an addend, and inputs the addend into the CSA 26. The CSA 26 performs processing for addition on the basis of the sums stored in the intermediate-remainder register 22a, the carriers stored in the intermediate-remainder register 22b, and the result of the calculation by the addend generation circuit 25. Then, the sums obtained by the processing by the CSA 26 are written in the intermediate-remainder register 22a, and the carries obtained by the processing by the CSA 26 are written in the intermediate-remainder register 22b. Thereafter, prediction of a partial quotient and operations on the basis of the predicted partial quotient are repeatedly performed until a final quotient having a desired number of digits is obtained. Thus, finally, the quotient obtained by the division of the digit-aligned dividend OP1 by the digit-aligned divisor OP2 is stored in the quotient register 28, and the sums and the carries representing the remainder obtained by the division of the digit-aligned dividend OP1 by the digit-aligned divisor OP2 are respectively stored the intermediate-remainder registers 22a and 22b. Further, when the contents of the intermediate-remainder registers 22a and 22b are updated, the adder/overflow detector 29 calculates the intermediate remainder, and determines whether or not an overflow occurs. When an overflow is determined to occur, the adder/overflow detector 29 outputs an error detection signal. When the division process is completed, the adder/overflow detector 29 calculates the final remainder on the basis of the contents of the intermediate-remainder registers 22a and 22b.

As explained above, an overflow of the intermediate remainder can be detected even in the divider using the CSA, and therefore the divider can output an error detection signal when the quotient prediction circuit 24 makes an error in prediction of a partial quotient.

A square-root calculator according to a fourth embodiment detecting an error in prediction of a solution is explained below. First, a sequence of a subtraction-and-shift type arithmetic using a recurrence equation is explained, and then a reason why a comparison between sign bits functions as a logic checker is explained.

In the following explanations, the difference of a numerical value inputted as a radicand (i.e., as an object the square root of which is to be calculated), from the square of an intermediate solution (which is a square root obtained in an intermediate stage) is referred to as an intermediate remainder, and the difference of the numerical value inputted as the radicand, from the square of a final solution (which is a square root obtained in the final stage) is referred to as a final remainder. The sign extension of the intermediate remainder is also made in the square-root calculation according to the fourth embodiment. In addition, the negative number is represented by a two's complement.

Only one numerical value, which is denoted by op3, is inputted into the square-root calculator according to the fourth embodiment, and the square-root calculator obtains a square root of the radicand op3. The radicand op3 undergoes digit alignment, and the digit-aligned radicand OP3 is indicated by the following equation.

$$OP3 = op3 \times k^b \text{ (where } k \text{ is a radix, and } b \text{ is an integer).}$$

Similar to the quotient in division, the square root $Q(n)$ constituted by first to n-th digits of can be expressed by using the partial square roots $q(0)$ to $q(n-1)$ as $$Q(n) = q(0) \times k^{n-1} + q(1) \times k^{n-2} + \ldots + q(n-2) \times k + q(n-1), \quad (9)$$

where $Q(0)$ is defined as zero. By deforming the equation (9), the following equations are obtained.

$$\begin{aligned} Q(n) &= q(0) \times k^{n-1} + q(1) \times k^{n-2} + \ldots + q(n-2) \times k + q(n-1) \\ &= k \times \left\{ \begin{array}{c} q(0) \times k^{n-2} + \\ q(1) \times k^{n-3} + \ldots + q(n-2) \end{array} \right\} + q(n-1) \\ &= k \times Q(n-1) + q(n-1) \end{aligned} \quad (10)$$

By using the digit-aligned radicand OP3 and the square root $Q(n)$, the subtraction-and-shift type square-root calculation can be defined by the following recurrence equation (11), where $r(n)$ denotes the n-th intermediate remainder.

$$r(n) = k^2 \times r(n-1) - 2k \times Q(n-1) \times q(n-1) - q^2(n-1)$$

$$r(0) = OP3 \quad (11)$$

(A proof of the recurrence equation (11) will be indicated as the proof 1 later.)

At this time, the partial square root $q(n-1)$ is an integer selected to satisfy the inequality criterion $|r(n)-1|<2Q(n)$. Although a plurality of candidates for the integer can exist in the range satisfying the condition $|q(n-1)|<k$, an arbitrary one of the candidates may be selected. That is, the partial square root $q(n-1)$ is calculated by using the inequality criterion $|r(n)-1|<2Q(n)$. (A proof of the appropriateness of the use of the inequality criterion $|r(n)-1|<2Q(n)$ will be indicated later as the proof 2.)

Therefore, on the analogy of the division process, in the case where the value of the sign bit of the intermediate remainder $r(n)$ (which is located immediately right-adjacent to the most significant digit of the intermediate remainder $r(n)$, and is the rightmost one of the sign bits) is denoted by s0, and the value of one of the extended sign bits immediately right-adjacent to the above sign bit (i.e., the rightmost one of the extended sign bits) is denoted by s1, the logic failure can be detected on the basis of only the exclusive OR of the above two sign bits (s0 XOR s1), because (s0 XOR s1)=0 when no error occurs, and (s0 XOR s1)=1 when an error occurs. (A proof that (s0 XOR s1)=1 when an error occurs will be indicated later as the proof 3.)

The aforementioned proof 1 that the square-root calculation can be performed by using the recurrence equation (11) is indicated below.

Since the relationships $Q^2(n) \approx OP3 = r(0)$ exists, the intermediate remainder $r(n)$ can be expressed by using $r(0)$ and $Q^2(n)$ as indicated in the equation (12).

$$r(n) = k^{2n} \times r(0) - Q^2(n) \quad (12)$$

Further, the following equations are derived from the equation (10).

$$\begin{aligned} r(n) &= k^{2n} \times r(0) - \{k \times Q(n-1) + q(n-1)\}^2 \\ &= k^{2n} \times r(0) - \left\{ \begin{array}{c} k^2 \times Q^2(n-1) + 2k \times Q(n-1) \times \\ q(n-1) + q^2(n-1) \end{array} \right\} \\ &= k^2 \times \{k^{2(n-1)} \times r(0) - Q^2(n-1)\} - \\ &\quad 2k \times Q(n-1) \times q(n-1) - q^2(n-1) \\ &= k^2 \times r(n-1) - 2k \times Q(n-1) \times q(n-1) - q^2(n-1) \end{aligned} \quad (13)$$

That is, the recurrence equation (11) is derived.

The aforementioned proof 2 that the inequality criterion $|r(n)-1|<2Q(n)$ can be appropriately used in calculation of the partial square root $q(n-1)$ is indicated below.

The inequality criterion $|r(n)-1|<2Q(n)$ is equivalently rewritten as follows.

$$-2Q(n)+1 < r(n) < 2Q(n)+1 \quad (14)$$

Hereinbelow, it is proved that the equation (14) exists for $n=1$. Thereafter, it is proved that the equation (14) exists for $n>1$ when the equation (14) exists for $n-1$.

When $n=1$, $Q(1)=q(0)>0$, and it is expected that $q(0)$ is selected so as to satisfy the condition $|k(OP3)^{1/2}-q(0)|<1$ because the digit positions of $k(OP3)^{1/2}$ and $q(0)$ are aligned so that the positions of the most significant digits of $k(OP3)^{1/2}$ and $q(0)$ match, and $q(0)$ is selected so that the integer parts of $k(OP3)^{1/2}$ and $q(0)$ match. That is, $$-1 < k \times (OP3)^{1/2} - q(0) < 1$$

$$<->$$

$$-1 < k \times (r(0))^{1/2} - q(0) < 1 \quad (15)$$

The left one of the simultaneous inequalities (15) leads to the following inequalities (16).

$$0 < k \times (r(0))^{1/2} - q(0) + 1$$

$$<->$$

$$0 < (k \times (r(0))^{1/2} + q(0) - 1)(k \times (r(0))^{1/2} - q(0) + 1)$$

$$<->$$

$$0 < k^2 \times r(0) - (q(0)-1)^2$$

$$<->$$

$$0 < k^2 \times r(0) - q^2(0) + 2q(0) - 1$$

$$<->$$

$$-2q(0) < k^2 \times r(0) - q^2(0) - 1 \quad (16)$$

In addition, the right one of the simultaneous inequalities (15) leads to the following inequalities (17).

$$k \times (r(0))^{1/2} - q(0) - 1 < 0$$

$$<->$$

$$(k \times (r(0))^{1/2} + q(0) + 1)(k \times (r(0))^{1/2} - q(0) - 1) < 0$$

$$<->$$

$$k^2 \times r(0) - (q(0)+1)^2 < 0$$

$$<->$$

$$k^2 \times r(0) - q^2(0) - 2q(0) - 1 < 0$$

<=>

$$k^2 \times r(0) - q^2(0) - 1 < 2q(0) \quad (17)$$

In consideration of the fact that q(0)>0, the inequalities (16) and (17) can be summarized to the simultaneous inequalities (18).

$$|k^2 \times r(0) - q^2(0) - 1| < 2q(0)$$

<=>

$$|r(1) - 1| < 2Q(1) \quad (18)$$

That is, the equation (14) exists when n=1.

Next is a proof that the inequality $-2Q(n)+1 < r(n)$ exists when the inequality $-2Q(n-1)+1 < r(n-1)$ exists.

In consideration of the inequality $-2Q(n-1)+1 < r(n-1)$, r(n) expressed by the equation (11) can be estimated as follows.

$$r(n) = k^2 \times r(n-1) - 2k \times Q(n-1) \times q(n-1) - \quad (19)$$

$$q^2(n-1) > k^2 \times \{-2Q(n-1)+1\} - 2k \times Q(n-1) \times$$

$$q(n-1) - q^2(n-1)$$

$$= -2kQ(n-1) \times \{k+q(n-1)\} +$$

$$\{k+q(n-1)\} \times \{k-q(n-1)\}$$

$$= \{k+q(n-1)\} \times \{-2k \times Q(n-1) + k - q(n-1)\}$$

$$= \{k+q(n-1)\} \times \begin{bmatrix} -2 \times \{k \times Q(n-1) + 2q(n-1)\} + \\ k+q(n-1) \end{bmatrix}$$

$$= \{k+q(n-1)\} \times [-2Q(n) + k + q(n-1)]$$

Since the right side of the inequality (19) is the lower limit of r(n), r(n) is greater than the right side of the inequality (19) in any case. When the value of q(n−1) is selected so as to increase the right side of the inequality (19), the equation q(n−1)=−(k−1) exists because the right side of the inequality (19) is maximized when q(n−1)=−(k−1) in consideration of the fact that −2Q(n)+k+q(n−1)<0 and 1<k+q(n−1)≦2k−1. Therefore, the equation (20) is obtained by substituting q(n−1)=−(k−1) in the inequality (19).

$$r(n) > -2Q(n) + 1 \quad (20)$$

Below is a proof that the inequality r(n)<2Q(n)+1 exists when the inequality r(n−1)<2Q(n−1)+1 exists.

In consideration of the inequality r(n−1)<2Q(n−1)+1, r(n) expressed by the equation (11) can be estimated as follows.

$$r'(n) = k^2 \times r(n-1) - 2k \times Q(n-1) \times q(n-1) - \quad (21)$$

$$q^2(n-1) < k^2 \times \{2Q(n-1)+1\} -$$

$$2k \times Q(n-1) \times q(n-1) - q^2(n-1)$$

$$= 2kQ(n-1) \times \{k-q(n-1)\} +$$

$$\{k+q(n-1)\} \times \{k-q(n-1)\}$$

$$= \{k-q(n-1)\} \times \{2k \times Q(n-1) + k + q(n-1)\}$$

$$= \{k-q(n-1)\} \times \begin{bmatrix} 2 \times \{k \times Q(n-1) + 2q(n-1)\} + \\ k-q(n-1) \end{bmatrix}$$

$$= \{k-q(n-1)\} \times [2Q(n) + k - q(n-1)]$$

When the value of q(n−1) is selected so as to decrease the right side of the inequality (21), the equation q(n−1)=k−1 exists. Therefore, the equation (22) is obtained.

$$r(n) < 2Q(n) + 1 \quad (22)$$

Thus, the inequalities (20) and (22) can be summarized to the inequality criterion |r(n)−1|<2Q(n). That is, the inequality criterion (14) is satisfied for n>1. In summary, the proof 2 that the inequality criterion (14) is satisfied for n≧1 is completed.

The aforementioned proof 3 that (s0 XOR s1)=1 when an error occurs is indicated below.

In the process for square-root calculation in accordance with the equation (11), each of the square root Q(n) and the intermediate remainder r(n) is an integer. However, in this case, the position of the most significant digit is shifted to the left by a number of digits proportional to the number of operations. In many practical applications in which a square-root calculator is realized by hardware, in order to fix the position of the most significant digit, the intermediate remainder r(n) and the square root Q(n) are respectively replaced with the digit-shifted intermediate remainder r'(n) and the digit-shifted square root Q'(n) defined as follows.

$$r'(n) = r(n)/k^n$$

$$Q'(n) = Q(n)/k^n \quad (23)$$

When both sides of the recurrence equation (11) is divided by $k^n$, the following recurrence equation (24) is obtained.

$$r'(n) = k \times r'(n-1) - 2Q'(n-1) \times q(n-1) - \quad (24)$$

$$(1/k^n) \times q^2(n-1)r(0)$$

$$= OP3$$

In this case, the aforementioned inequality criterion for use in the selection of the integer as the partial square root q(n−1) becomes |r'(n)−1/k$^n$|<2Q'(n). When an integer which does not satisfy the inequality criterion. |r'(n)−1/k$^n$|<2Q'(n) is selected as the partial square root q(n−1), an overflow occurs in the result of calculation of the digit-shifted intermediate remainder r'(n) while the prediction of a partial square root is repeated. In other words, the number of digits of the result of calculation of the digit-shifted intermediate remainder r'(n) exceeds the number of digits of the region for storage of the digit-shifted intermediate remainder r'(n), so that the value of the sign bit s0 of the digit-shifted intermediate remainder r'(n) (which is located immediately right-adjacent to the most significant one of the non-sign bits of the digit-shifted intermediate remainder r'(n)) differs from the value of the extended sign bit s1 immediately right-adjacent to the sign bit s0. Thus, the logic failure can be detected on the basis of only the exclusive OR of the above two sign bits (s0 XOR s1), and the logic circuit added to the arithmetic circuit for detection of an error in determination whether to satisfy the inequality criterion |r'(n)−1/k$^n$|<2Q'(n) can be only one exclusive OR circuit (XOR gate).

Figure 7:
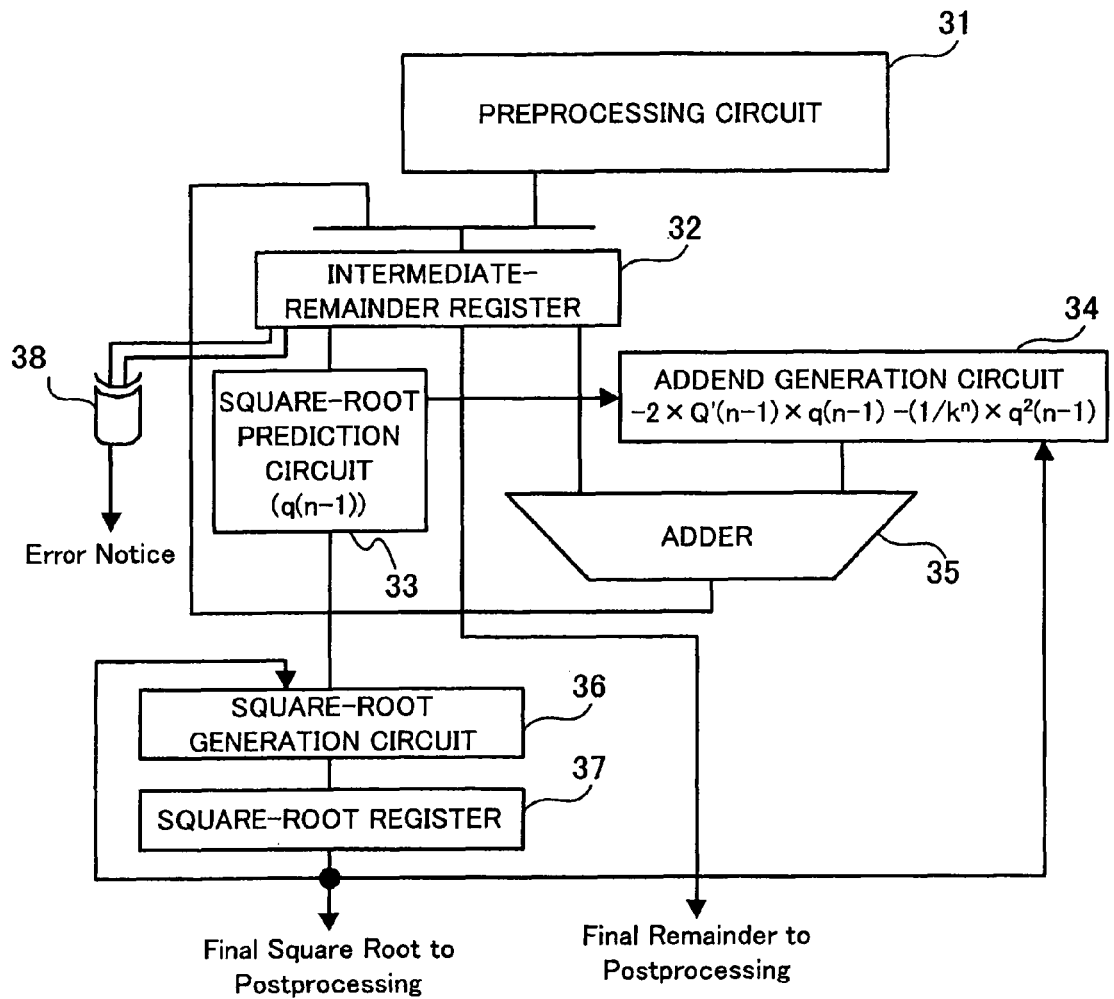
FIG. 7 illustrates a square-root calculator according to a fourth embodiment.

FIG. 7 illustrates a square-root calculator according to the fourth embodiment. The square-root calculator of FIG. 7 comprises a preprocessing circuit 31, an intermediate-remainder register 32, a square-root prediction circuit 33, an addend generation circuit 34, an adder 35, a square-root generation circuit 36, a square-root register 37, and an exclusive OR circuit 38.

The preprocessing circuit 31 performs preprocessing such as the alignment of the digit positions of the radicand. The preprocessing circuit 31 has an output signal line connected to the intermediate-remainder register 32, and stores the digit-aligned radicand OP3 in the intermediate-remainder register 32.

The intermediate-remainder register 32 is a register for storing the intermediate remainder. For example, a register having a bit width of 64 bits can be used as the intermediate-remainder register 32 for storing the intermediate remainder in the double-precision floating-point format in accordance with IEEE 754 standard. The intermediate-remainder register 32 has output signal lines respectively connected to the square-root prediction circuit 33, the adder 35, and a circuit (not depicted) which performs post-processing of a final remainder obtained as a result of the square-root calculation performed by the square-root calculator of FIG. 7.

The square-root prediction circuit 33 predicts a partial square root $q(n-1)$ on the basis of the intermediate remainder held in the intermediate-remainder register 32. Specifically, the square-root prediction circuit 33 determines the partial square root $q(n-1)$ so that the intermediate remainder obtained in accordance with the recurrence equation (24) satisfies the inequality criterion $|r'(n)-1/k''|<2Q'(n)$. However, when the square-root prediction circuit 33 has a logic failure and a specific combination of the values of the digit-shifted square root $Q'(n)$ and the intermediate remainder which make the logic failure evident occurs, or when a fixed failure of a transistor cell or a software error caused by a factor such as a radiation occurs, the square-root prediction circuit 33 can predict a partial square root $q(n-1)$ which leads to violation of the inequality criterion $|r'(n)-1/k''|<2Q'(n)$. The square-root prediction circuit 33 has output signal lines respectively connected to the addend generation circuit 34 and the square-root generation circuit 36.

The addend generation circuit 34 calculates a value (addend) to be added to the intermediate remainder. Specifically, the addend generation circuit 34 calculates $\{-2\times Q'(n-1)\times q(n-1)-(1/k'')\times q^2(n-1)\}$. The calculated value is used by the adder 35 for obtaining from the current intermediate remainder a new intermediate remainder corresponding to a new square root in which the newly predicted partial square root is incorporated. In the case where the current intermediate remainder is greater then the new intermediate remainder, the calculation result (addend) obtained by the addend generation circuit 34 is a negative number. The negative number is represented by a two's complement. The addend generation circuit 34 has an output signal line connected to the adder 35, and the output of the addend generation circuit 34 is supplied to the adder 35.

The adder 35 adds inputted values. Specifically, the adder adds the addend calculated by the addend generation circuit 34 to the intermediate remainder stored in the intermediate-remainder register 32. The adder 35 has an output signal line connected to the intermediate-remainder register 32, so that the result of the addition outputted from the adder 35 is stored as an intermediate remainder in the intermediate-remainder register 32. Similar to the adder 16 in the first embodiment, the adder 35 can perform subtraction by addition of a negative number represented by a two's complement.

The square-root generation circuit 36 generates a value of a square root on the basis of one or more partial square roots which are already generated by the square-root prediction circuit 33, and outputs the generated value of the square root. The square-root generation circuit 36 has an output signal line connected to the square-root register 37, and the value of the square root generated by the square-root generation circuit 36 is written in the square-root register 37. Specifically, every time a partial square root is newly predicted by the square-root prediction circuit 33, the square-root generation circuit 36 reads in the value of the square root currently stored in the square-root register 37, shifts the value of the square root to the left by a predetermined number of digits, adds the newly predicted partial square root to the predetermined number of digits which are vacated by the shift, and writes in the square-root register 37 the value of the square root to which the newly predicted partial square root is added.

The square-root register 37 is a register for storing the value of the square root. The square-root register 37 has output signal lines respectively connected to the addend generation circuit 34, the square-root generation circuit 36, and a circuit (not depicted) which performs post-processing of the final value of the square root (final square root).

The exclusive OR circuit 38 is connected to the intermediate-remainder register 32. Specifically, an output signal line of the sign bit of the intermediate remainder stored in the intermediate-remainder register 32 and an output signal line of an extended sign bit located on the significant side of the sign bit of the intermediate remainder in the intermediate-remainder register 32 are connected to the inputs of the exclusive OR circuit 38. That is, the exclusive OR circuit 38 is connected to the intermediate-remainder register 32 in a similar manner to the connection of the exclusive OR circuit 19 to the intermediate-remainder register 12 illustrated in FIG. 3. The exclusive OR of the two bits inputted into the exclusive OR circuit 38 is calculated by the exclusive OR circuit 38. The exclusive OR circuit 38 outputs "0" when the two inputted bits are identical, and "1" when the two inputted bits are different.

According to the present embodiment, the operations for square-root calculation are performed by using the square-root calculator having the construction illustrated in FIG. 7. The operations of the square-root calculator according to the fourth embodiment are summarized below.

In order to perform the operations for square-root calculation, the radicand op3 is inputted into the preprocessing circuit 31. Then, the preprocessing circuit 31 performs alignment of the digit positions of the radicand, so that digit-aligned radicand OP3 is generated. The preprocessing circuit 31 stores the digit-aligned radicand OP3 in the intermediate-remainder register 32. Next, the square-root prediction circuit 33 predicts a partial square root corresponding to the most significant digit obtained from the digit-aligned radicand OP3 stored in the intermediate-remainder register 32, and inputs the predicted partial square root into the addend generation circuit 34 and the square-root generation circuit 36. The square-root generation circuit 36 stores in the square-root register 37 the partial square root which is first predicted by the square-root prediction circuit 33, as is. In addition, the addend generation circuit 34 calculates $\{-2\times Q'(n-1)\times q(n-1)-(1/k'')\times q^2(n-1)\}$ as an addend, and inputs the calculated addend into the adder 35. The adder 35 adds the addend calculated by the addend generation circuit 34 to the digit-aligned radicand OP3 which is initially stored in the intermediate-remainder register 32, and the contents of the intermediate-remainder register 32 is updated from the digit-aligned radicand OP3 to an intermediate remainder. When the contents of the intermediate-remainder register 32 are updated, the square-root prediction circuit 33 newly predicts a partial square root corresponding to the next significant digit, and inputs the predicted partial square root into the addend generation circuit 34 and the square-root generation circuit 36. Then, the square-root generation circuit 36 shifts the value stored in the square-root register 37 to the left, adds the newly predicted partial square root to the digits located on the less significant side of the shifted value, and updates the contents of the square-root register 37 with the value to which the newly predicted partial square root is added. Subsequently, the addend generation circuit 34 calculates $\{-2 \times Q'(n-1) \times q(n-1)-(1/k'') \times q^2(n-1)\}$ as an addend, and inputs the addend into the adder 35. The adder 35 adds the addend calculated by the addend generation circuit 34 to the intermediate remainder stored in the intermediate-remainder register 32, and the contents of the intermediate-remainder register 32 is updated with the output of the adder 35. Thereafter, prediction of a partial square root and operations on the basis of the predicted partial square root are repeatedly performed until a final square root having a desired number of digits is obtained. Thus, finally, the square root of the digit-aligned radicand OP3 and the remainder obtained by the square-root calculation of the digit-aligned radicand OP3 are respectively stored in the square-root register 37 and the intermediate-remainder register 32.

In the above process for square-root calculation, the value of the least significant bit in the extended sign-bit series of the intermediate remainder is always identical to the value of the sign bit of the intermediate remainder unless the square-root prediction circuit 33 makes an error in the prediction of a partial square root.

Figure 8:
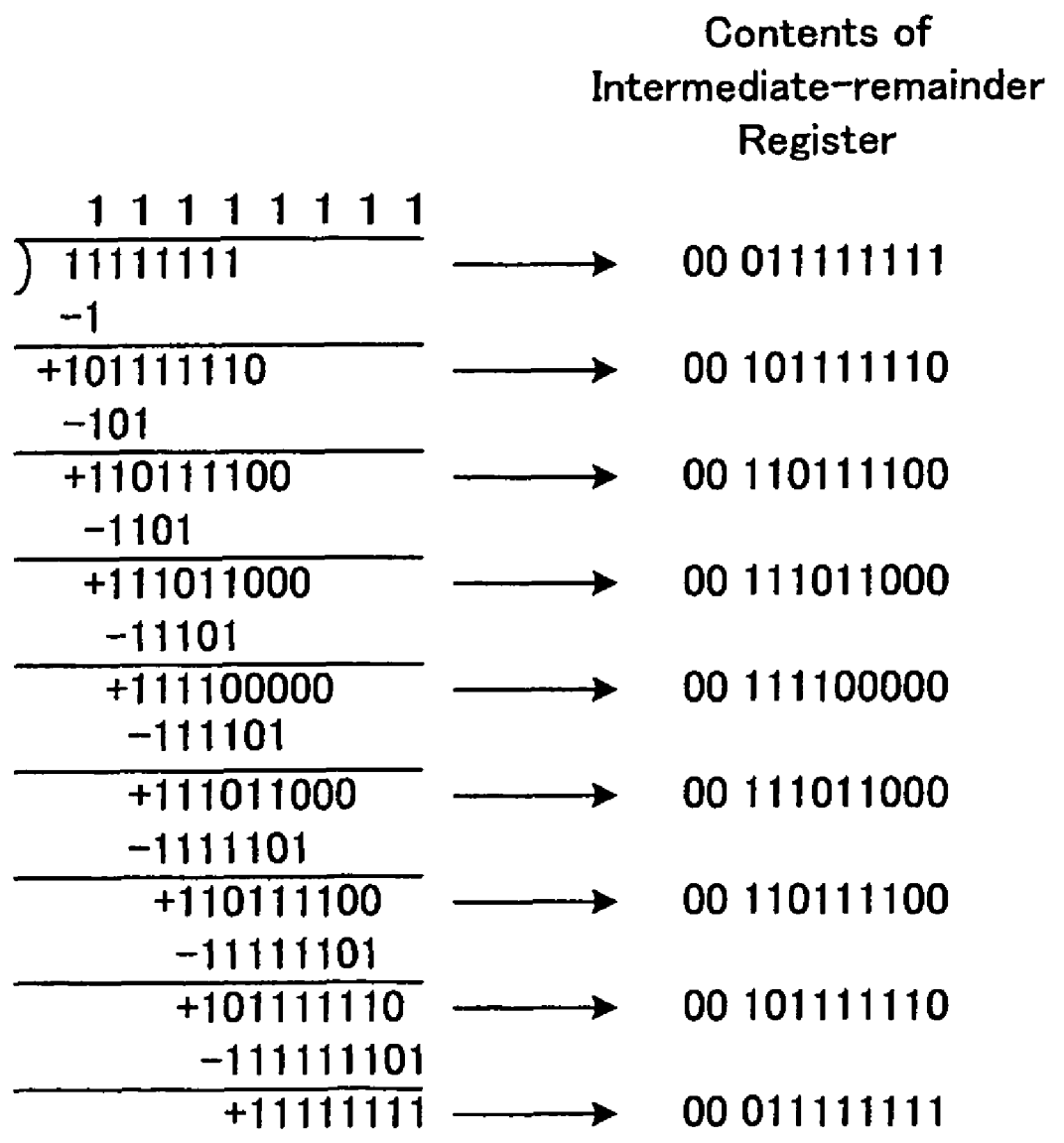

FIG. 8 illustrates an example of square-root calculation in which partial square roots are normally determined. In the example of FIG. 8, for simplicity, the radicand is an 8-bit binary number, and assumed to have already undergone the alignment of the digit positions, and the digit-aligned radicand OP3 is "+11111111." The square-root calculator calculates the square root of the digit-aligned radicand OP3. In FIG. 8, the process for square-root calculation is indicated in the left half, and the contents of the intermediate-remainder register in the respective stages during the process for square-root calculation are indicated in the right half. In the illustrated bits of the intermediate-remainder register in each stage, the leftmost bit is the least significant one of the extended sign bits, the second bit from the left is the sign bit of the intermediate remainder, and the nine bits illustrated on the right side of the sign bit indicate the non-sign bits of the intermediate remainder.

The square-root prediction circuit 33 predicts the partial square roots on a digit-by-digit basis in descending order of digit significance. While the intermediate remainder is positive, both of the sign bit and the extended sign bit indicated on the significant side of the sign bit are "0." When the intermediate remainder is negative, both of the sign bit and the extended sign bit are "1." In either case, the sign bit and the extended sign bit are identical unless the square-root prediction circuit 33 makes an error in the prediction of a partial square root.

When the square-root prediction circuit 33 has a logic failure, or when a fixed failure of a transistor cell or a software error caused by a factor such as a radiation occurs, the square-root prediction circuit 33 can make an error in prediction of a partial square root during the process for square-root calculation, i.e., the square-root prediction circuit 33 can predict a partial square root q(n−1) which leads to violation of the inequality criterion $|r'(n)-1/k''|<2Q'(n)$. When the inequality criterion $|r'(n)-1/k''|<2Q'(n)$ is violated, an overflow of the intermediate remainder occurs, so that a numerical value different from the sign bit of the intermediate remainder is set in the position of the sign bit, to which the sign bit of the intermediate remainder is to be set. Therefore, the value of the sign bit becomes different from the value of the least significant one of the extended sign bits.

Figure 9:
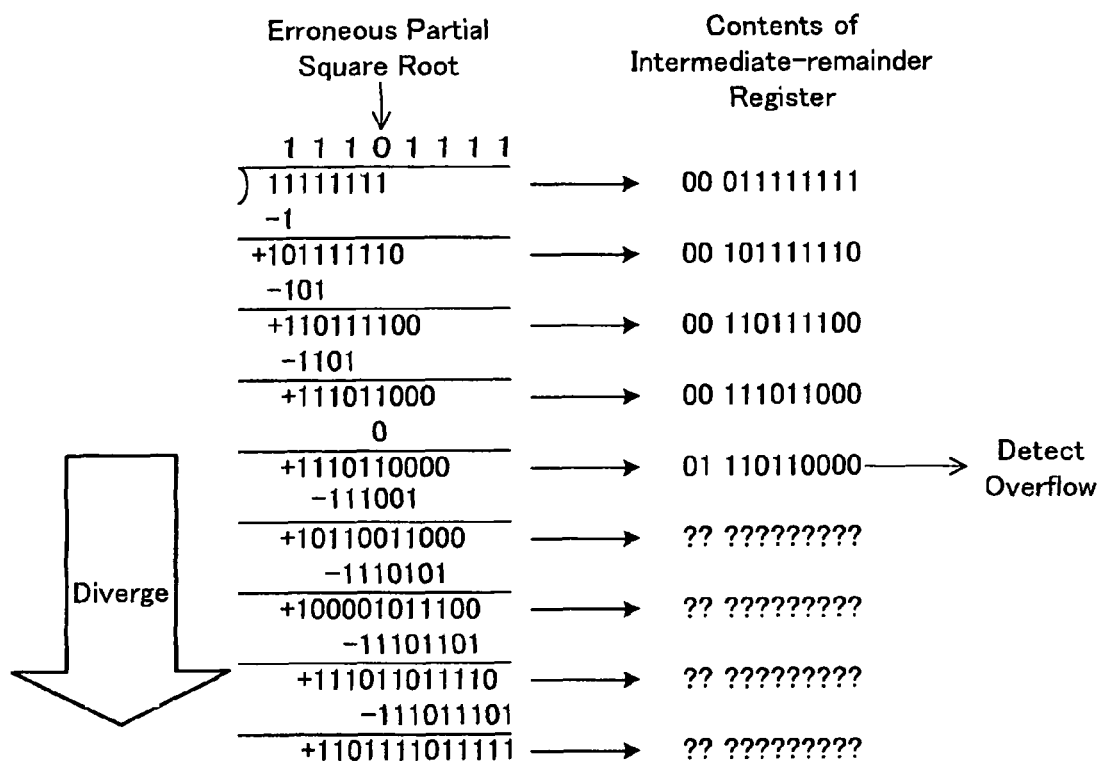
FIG. 9 illustrates an example of square-root calculation in which a partial square root is erroneously determined.

FIG. 9 illustrates an example of square-root calculation in which a partial square root is erroneously determined. In the example of FIG. 9, an error occurs in the determination of the partial square root q(3) corresponding to the fourth significant digit. In this determination, the partial square root q(3) is determined to be one in order to satisfy the inequality criterion $|r'(4)-1/k^4|<2Q'(4)$. However, the square-root prediction circuit 33 erroneously determines the partial square root to be zero in the example of FIG. 9.

The number of digits of the intermediate remainder calculated by using the above erroneous partial square root corresponding to the fourth significant digit becomes ten, which exceeds the number (nine) of bits in the bit series of the intermediate remainder in the intermediate-remainder register 32, so that an overflow occurs. As a result, the value of the most significant digit of the intermediate remainder calculated with the overflow is set in the position of the sign bit, so that the value of the sign bit becomes "1" although the intermediate remainder is positive. At this time, the least significant one of the extended sign bits is still "0." That is, the value of the sign bit is different from the value of the least significant one of the extended sign bits. The identity or difference in the value between the sign bit and the least significant one of the extended sign bits is detected by the exclusive OR circuit 38. When the output signal of the exclusive OR circuit 38 is "1," the output signal is a notice of an error.

Incidentally, it is unknown how operations for calculation proceed after the intermediate remainder once diverges. For example, it is unknown whether or not the operations for calculation proceed as indicated in the right half of FIG. 9.

As explained above, according to the fourth embodiment, the overflow of the intermediate remainder can be detected by merely connecting the exclusive OR circuit 38 to the intermediate-remainder register 32. Therefore, when the square-root prediction circuit 33 makes an error in prediction of a partial square root, it is possible to issue a notice of the error. Since the function of detecting an error in prediction of a partial square root can be realized by only the addition of the exclusive OR circuit 38, the increase in the size of the arithmetic circuit by the realization of the function can be minimized.

A square-root calculator according to a fifth embodiment using a CSA (carry save adder) is explained below.

Figure 10:
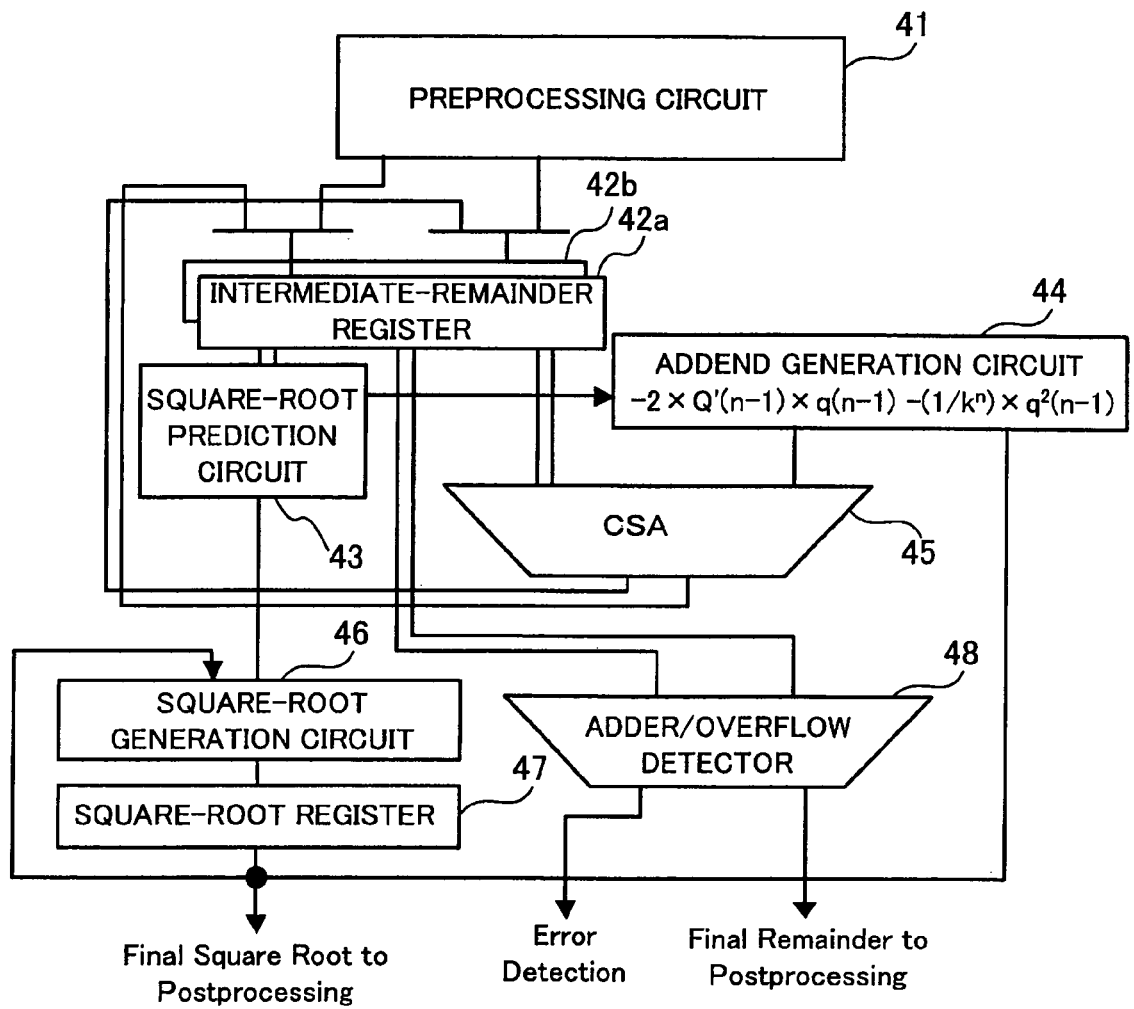
FIG. 10 illustrates a square-root calculator according to a fifth embodiment.

FIG. 10 illustrates a square-root calculator according to the fifth embodiment. The square-root calculator of FIG. 10 comprises a preprocessing circuit 41, intermediate-remainder registers 42a and 42b, a square-root prediction circuit 43, an addend generation circuit 44, a CSA (carry save adder) 45, a square-root generation circuit 46, a square-root register 47, and an adder/overflow detector 48.

The preprocessing circuit 41 performs preprocessing such as the alignment of the digit positions of the radicand. The preprocessing circuit 41 has output signal lines respectively connected to the intermediate-remainder registers 42a and 42b, and stores the digit-aligned radicand OP3 in the intermediate-remainder register 42a.

The intermediate-remainder registers 42a and 42b are registers provided for separately storing sums and carries. For example, the values of sums are stored in the intermediate-remainder register 42a, and the values of carries are stored in the intermediate-remainder register 42b. The intermediate-remainder registers 42a and 42b have output signal lines respectively connected to the square-root prediction circuit 43, the CSA 45, and the adder/overflow detector 48.

The square-root prediction circuit 43 predicts a partial square root q(n−1) on the basis of the intermediate remainder stored in the intermediate-remainder registers 42a and 42b (i.e., on the basis of the sums and the carries which are separately stored in the intermediate-remainder registers 42a and 42b and indicate the intermediate remainder). The square-root prediction circuit 43 has output signal lines respectively connected to the addend generation circuit 44 and the square-root generation circuit 46.

The addend generation circuit 44 calculates a value (addend) to be added to the intermediate remainder. Specifically, the addend generation circuit 44 calculates $\{-2 \times Q'(n-1) \times q(n-1) - (1/k'') \times q^2(n-1)\}$ as an addend. The addend generation circuit 44 has an output signal line connected to the CSA 45, and the output of the addend generation circuit 44 is supplied to the CSA 45.

The CSA 45 performs processing for addition on the basis of inputted values, and outputs an intermediate remainder represented by sums and carries, which are separated. The CSA 45 obtains a sum and a carry for each digit, and separately outputs for each digit the carry from the digit and the sum without the carry. Specifically, the CSA 45 performs processing for addition on the basis of the addend calculated by the addend generation circuit 44 and the sums and the carries which are stored in the intermediate-remainder registers 42a and 42b and indicate the intermediate remainder. The CSA 45 has output signal lines connected to the intermediate-remainder registers 42a and 42b, so that the sums and the carries obtained by the processing for addition performed by the CSA 45 are respectively stored in the intermediate-remainder registers 42a and 42b.

The square-root generation circuit 46 generates a value of a square root on the basis of one or more partial square roots which are already generated by the square-root prediction circuit 43, and outputs the generated value of the square root. The square-root generation circuit 46 has an output signal line connected to the square-root register 47.

The square-root register 47 is a register for storing the value of the square root. The square-root register 47 has output signal lines respectively connected to the addend generation circuit 44, the square-root generation circuit 46, and a circuit (not depicted) which performs post-processing of the final value of the square root (final square root).

The adder/overflow detector 48 acquires the sums and the carries from the intermediate-remainder registers 42a and 42b, performs the processing for addition on the basis of the sums and the carries, and generates a remainder. The remainder calculated by the adder/overflow detector 48 is an intermediate remainder before the process for square-root calculation is completed. When the process for square-root calculation is completed, the adder/overflow detector 48 calculates a final remainder and outputs the final remainder to a circuit (not depicted) which performs post-processing.

In addition, the adder/overflow detector 48 performs processing for detecting an overflow. Specifically, the adder/overflow detector 48 determines whether or not the number of digits of the calculated remainder including the sign bit exceeds a predetermined number, and outputs an error detection signal when yes is determined.

According to the fifth embodiment, the operations for calculation of a square root are performed by using the square-root calculator having the construction illustrated in FIG. 10. The operations of the square-root calculator according to the fifth embodiment are summarized below.

In order to perform the operations for calculation of a square root, the radicand op3 is inputted into the preprocessing circuit 41. Then, the preprocessing circuit 41 performs alignment of the digit positions of the radicand, so that digit-aligned radicand OP3 is generated. The preprocessing circuit 41 stores the digit-aligned radicand OP3 in the intermediate-remainder register 42a. Next, the square-root prediction circuit 43 predicts a partial square root corresponding to the most significant digit obtained from the digit-aligned radicand OP3 stored in the intermediate-remainder register 42a, and inputs the predicted partial square root into the addend generation circuit 44 and the square-root generation circuit 46. The square-root generation circuit 46 stores in the square-root register 47 the partial square root which is first predicted by the square-root prediction circuit 43, as is. In addition, the addend generation circuit 44 calculates $\{-2 \times Q'(n-1) \times q(n-1) - (1/k'') \times q^2(n-1)\}$ as an addend, and inputs the addend into the CSA 45. The CSA 45 adds the addend calculated by the addend generation circuit 44 to the digit-aligned radicand OP3 which is initially stored in the intermediate-remainder register 42a, and outputs the calculation result represented by sums and carries. At this time, the sums are written in the intermediate-remainder register 42a, and the carriers are written in the intermediate-remainder register 42b. When the contents of the intermediate-remainder registers 42a and 42b are updated, the square-root prediction circuit 43 newly predicts a partial square root corresponding to the next significant digit on the basis of the contents of the intermediate-remainder registers 42a and 42b, and inputs the predicted partial square root into the addend generation circuit 44 and the square-root generation circuit 46. Then, the square-root generation circuit 46 shifts the value stored in the square-root register 47 to the left, adds the newly predicted partial square root to the digits located on the less significant side of the shifted value, and updates the contents of the square-root register 47 with the value to which the newly predicted partial square root is added. Subsequently, the addend generation circuit 44 calculates $\{-2 \times Q'(n-1) \times q(n-1) - (1/kn) \times q^2(n-1)\}$ as an addend, and inputs the addend into the CSA 45. The CSA 45 performs processing for addition on the basis of the sums stored in the intermediate-remainder register 42a, the carriers stored in the intermediate-remainder register 42b, and the result of the calculation by the addend generation circuit 44. Then, the sums obtained by the processing by the CSA 45 are written in the intermediate-remainder register 42a, and the carries obtained by the processing by the CSA 45 are written in the intermediate-remainder register 42b. Thereafter, prediction of a partial square root and operations on the basis of the predicted partial square root are repeatedly performed until a final square root having a desired number of digits is obtained. Thus, finally, the square root of the digit-aligned radicand OP3 obtained by the above square-root calculation is stored in the square-root register 47, and the sums and the carries representing the remainder obtained by the square-root calculation of the digit-aligned radicand OP3 are respectively stored in the intermediate-remainder registers 42a and 42b. Further, when the contents of the intermediate-remainder registers 42a and 42b are updated, the adder/overflow detector 48 calculates the intermediate remainder, and determines whether or not an overflow occurs. When an overflow is determined to occur, the adder/overflow detector 48 outputs an error detection signal. When the process for square-root calculation is completed, the adder/overflow detector 48 calculates the final remainder on the basis of the contents of the intermediate-remainder registers 42a and 42b.

As explained above, an overflow of the intermediate remainder can be detected even in the square-root calculator using the CSA, and therefore the square-root calculator can output an error detection signal when the square-root prediction circuit 43 makes an error in prediction of a partial quotient.

An arithmetic processing device according to a sixth embodiment, which contains the divider according to the second embodiment and the square-root calculator according to the fourth embodiment, is explained below. The arithmetic processing device may be, for example, a CPU (central processing unit) or an FPU (floating-point number processing unit).

Figure 11:
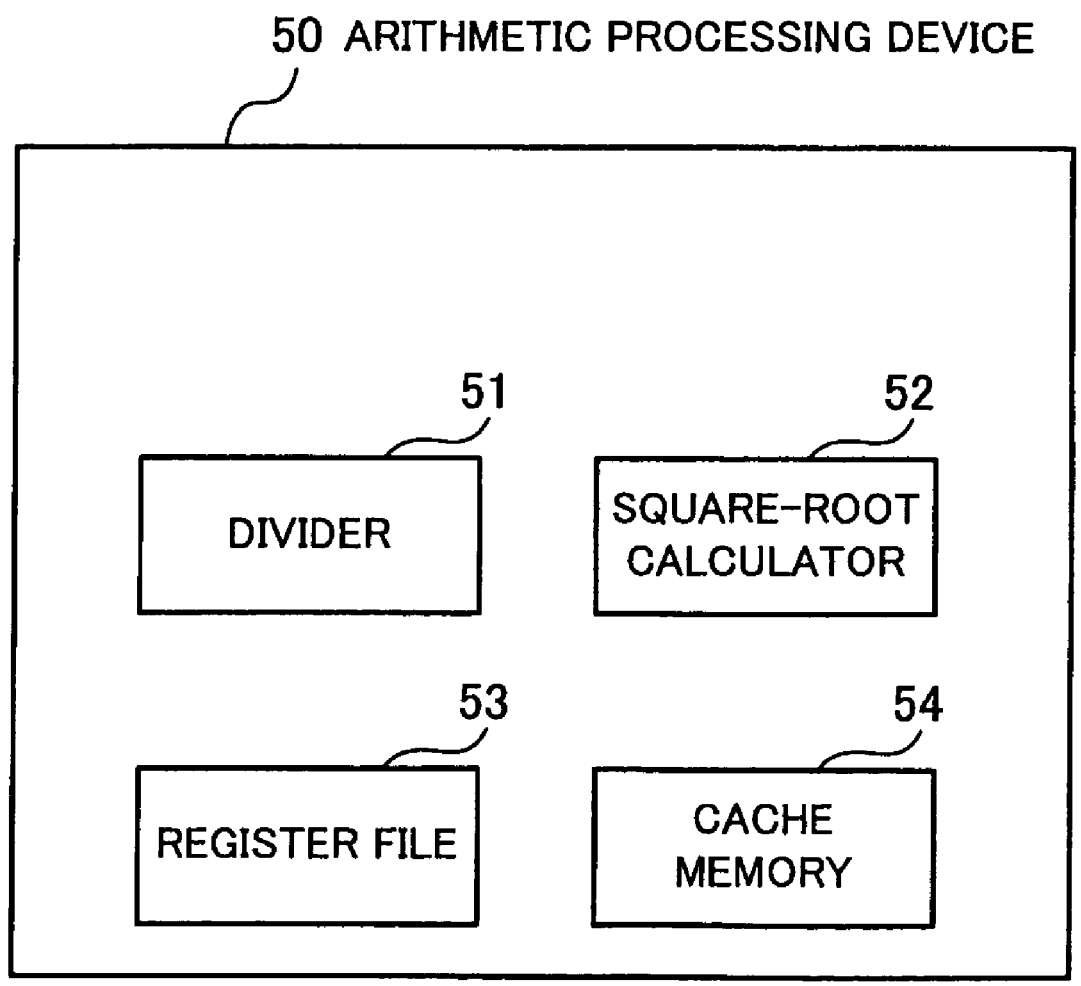
FIG. 11 indicates an example of an arithmetic processing device.

FIG. 11 indicates the arithmetic processing device according to the sixth embodiment. The arithmetic processing device 50 of FIG. 11 comprises a divider 51, a square-root calculator 52, a register file 53, and a cache memory 54. The divider 51 has an internal construction as illustrated in FIG. 2, and the square-root calculator 52 has an internal construction as illustrated in FIG. 7. The arithmetic processing device 50 is configured to perform error processing when the divider 51 or the square-root calculator 52 outputs an error signal.

The register file 53 and the cache memory 54 are storage devices for supplying numerical values as objects on which arithmetic operations are to be performed, and storing results of the arithmetic operations performed by the divider 51 or the square-root calculator 52. Therefore, each of the preprocessing circuits in the divider 51 and the square-root calculator 52 reads out one or more of the numerical values as the objects on which arithmetic operations are to be performed, from the register file 53 or the cache memory 54.

Since the arithmetic processing device 50 contains the divider 51 and the square-root calculator 52, each of which has the function of detecting an error, the arithmetic processing device 50 can detect with high reliability an error in prediction of a partial quotient or a partial square root, so that the reliability of the arithmetic processing device 50 is increased.

The error detection circuits in the divider 51 and the square-root calculator 52 are primarily an exclusive OR circuit. Therefore, for example, in the case where the arithmetic processing device 50 is an integrated circuit having high-density wiring and being called an LSI (large-scale integrated circuit), the chip size of the LSI is not substantially increased by addition of the error detection circuits. If the size of the LSI is increased, the number of chips which can be produced from a single silicon wafer decreases, so that the unit manufacturing cost of the LSI increases. Since the error detection circuits according to the embodiments explained before can be built in without substantially increasing the chip size, the error detection circuits can also be built in without substantially increasing the manufacturing cost of the LSI.

Alternatively, the divider 51 illustrated in FIG. 11 may contain the divider illustrated in FIG. 6, instead of the divider illustrated in FIG. 2, and the square-root calculator illustrated in FIG. 10, instead of the square-root calculator illustrated in FIG. 7.

The above arithmetic circuit can detect with high reliability a malfunction which can occur during an arithmetic operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a explaining of the superiority and inferiority of the invention. Although the embodiment(s) of the present invention has(have) been described in detail, it should be understood that various changes, substitutions and alterations could be made hereto without departing from the spirit and scope of the invention.

Specifically, each element constituting the first to sixth embodiments may be replaced with another element having a similar function, and any further element or any further step may be added to the first to sixth embodiments. Further, it is possible to arbitrarily combine two or more of the features of the first to sixth embodiments explained before.

What is claimed is:

1. An arithmetic circuit comprising:
   a register;
   a preprocessing circuit that stores in the register an objective numerical value;
   a solution prediction circuit that predicts a partial solution on the basis of the numerical value every time the numerical value is stored in the register, where the partial solution is a value represented by a part of digits constituting a solution to be obtained from the objective numerical value and prediction is made in descending order of digit significance;
   an intermediate-value calculation circuit that generates an intermediate value by a predetermined calculation using one or more partial solutions predicted by the solution prediction circuit, appends one or more extended sign bits to the intermediate value by sign extension, and stores the intermediate value to which the one or more extended sign bits are appended in the register;
   a solution generation circuit that sequentially acquires the one or more partial solutions predicted by the solution prediction circuit, and generates a solution on the basis of the one or more partial solutions; and
   an error detection circuit that compares a value of a sign bit constituting the intermediate value stored in the register with a value of one of the one or more extended sign bits stored in the register, and detects an error when the value of the sign bit is different from the value of the one of the one or more extended sign bits.

2. The arithmetic circuit according to claim 1, wherein the error detection circuit is an exclusive OR circuit having inputs connected to the sign bit and the one of the one or more extended sign bits of the intermediate value stored in the register.

3. The arithmetic circuit according to claim 1, further comprising a divisor register that stores a divisor for division, wherein the preprocessing circuit stores a dividend for the division in the register and the divisor in the divisor register, the solution prediction circuit predicts as the partial solution constituting a quotient to be obtained by the division of the dividend by the divisor, and the intermediate-value calculation circuit generates an intermediate remainder as the intermediate value by obtaining a product of the divisor and the partial quotient and subtracting the product from the numerical value stored in the register.

4. The arithmetic circuit according to claim 3, wherein the intermediate-value calculation circuit comprises
   an addend generation circuit that generates an addend by generating a product of the divisor and the partial quotient and inverting a sign of the product, and
   an adder that adds the addend to the numerical value stored in the register.

5. The arithmetic circuit according to claim 1, wherein said preprocessing circuit stores in the register a radicand for square-root calculation, and the solution prediction circuit predicts as the partial solution of a square root constituting a square root obtained from the radicand by the square-root calculation.

6. The arithmetic circuit according to claim 5, wherein the intermediate-value calculation circuit comprises an addend generation circuit that generates an addend for use in calculation of a difference of the radicand from a square of a square root constituted by one or more partial solutions predicted by the solution prediction circuit, and an adder that adds the addend to the numerical value stored in the register.

7. The arithmetic circuit according to claim 1, wherein the register includes a first register and a second register,
   the solution prediction circuit predicts the partial solution on the basis of numerical values stored in the first register and the second register,
   the intermediate-value calculation circuit stores in the first register sums being obtained at respective digits by addition performed in a final stage of the predetermined calculation and not containing carries, and stores in the second register the carries obtained at the respective digits by the addition performed in the final stage of the predetermined calculation, and
   the error detection circuit performs addition on the basis of the sums and the carries stored in the first register and the second register, compares values of a sign bit and an extended sign bit in a result of the addition on the basis of the sums and the carries stored in the first register and the second register, and detects an error when the values of the sign bit and the extended sign bit in the result of the addition on the basis of the numerical values stored in the first register and the second register are different.

8. The arithmetic circuit according to claim 2, wherein the one of the one or more extended sign bits is located immediately adjacent to the sign bit on a more significant side.

9. An arithmetic processing device comprising:
   a storage device that stores one or more numerical values;
   a register;
   a preprocessing circuit that reads out from the storage device an objective numerical value, and stores the objective numerical value in the register;
   a solution prediction circuit that predicts a partial solution on the basis of the numerical value every time the numerical value is stored in said register, where the partial solution is a value represented by a part of digits constituting a solution to be obtained from the objective numerical value and prediction is made in descending order of digit significance;
   an intermediate-value calculation circuit that generates an intermediate value by a predetermined calculation using one or more partial solutions predicted by the solution prediction circuit, appends one or more extended sign bits to the intermediate value by sign extension, and stores in the register the intermediate value to which the one or more extended sign bits are appended;
   a solution generation circuit that sequentially acquires the one or more partial solutions predicted by the solution prediction circuit, and generates a solution on the basis of the one or more partial solutions; and
   an error detection circuit that compares a value of a sign bit constituting the intermediate value stored in the register with a value of one of the one or more extended sign bits stored in the register, and detects an error when the value of the sign bit is different from the value of the one of the one or more extended sign bits.

10. The arithmetic processing device according to claim 9, wherein the error detection circuit is an exclusive OR circuit having inputs connected to the sign bit and the one of the one or more extended sign bits of the intermediate value stored in the register.

11. The arithmetic processing device according to claim 9, further comprising a divisor register that stores a divisor for division, wherein the preprocessing circuit stores a dividend for the division in the register and the divisor in the divisor register, the solution prediction circuit predicts as the partial solution constituting a quotient to be obtained by the division of the dividend by the divisor, and the intermediate-value calculation circuit generates an intermediate remainder as the intermediate value by obtaining a product of the divisor and the partial quotient and subtracting the product from the numerical value stored in the register.

12. The arithmetic processing device according to claim 9, wherein the preprocessing circuit stores in the register a radicand for square-root calculation, and the solution prediction circuit predicts as the partial solution a partial square root constituting a square root to be obtained from the radicand by the square-root calculation.

13. An arithmetic processing method in an arithmetic circuit, comprising:
   predicting a partial solution on the basis of the numerical value every time a numerical value is stored in a register, where the partial solution is a value represented by a part of digits constituting a solution to be obtained from the objective numerical value and prediction is made in descending order of digit significance;
   generating an intermediate value by a predetermined calculation using one or more partial solutions predicted appends one or more extended sign bits to the intermediate value by sign extension, and stores in the register the intermediate value to which the one or more extended sign bits are appended;
   sequentially acquiring the one or more partial solutions predicted, and generating a solution on the basis of the one or more partial solutions; and
   comparing a value of a sign bit constituting the intermediate value stored in the register with a value of one of the one or more extended sign bits stored in the register, and detects an error when the value of the sign bit is different from the value of the one of the one or more extended sign bits.

* * * * *